United States Patent
Park et al.

(10) Patent No.: US 12,196,483 B2
(45) Date of Patent: Jan. 14, 2025

(54) FOOD MANAGEMENT SYSTEM, COMPUTING APPARATUS AND REFRIGERATOR

(71) Applicant: SAMSUNG ELECTRONICS CO., LTD., Suwon-si (KR)

(72) Inventors: Seong Su Park, Suwon-si (KR); Seong Joo Han, Suwon-si (KR); Myung Sik Kim, Suwon-si (KR); Gye Young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 519 days.

(21) Appl. No.: 17/291,437

(22) PCT Filed: Oct. 23, 2019

(86) PCT No.: PCT/KR2019/013989
§ 371 (c)(1),
(2) Date: May 5, 2021

(87) PCT Pub. No.: WO2020/096235
PCT Pub. Date: May 14, 2020

(65) Prior Publication Data
US 2022/0003493 A1 Jan. 6, 2022

(30) Foreign Application Priority Data
Nov. 5, 2018 (KR) .................. 10-2018-0134454

(51) Int. Cl.
*F25D 29/00* (2006.01)
*G06N 3/08* (2023.01)
(52) U.S. Cl.
CPC ............. *F25D 29/00* (2013.01); *G06N 3/08* (2013.01); *F25D 2400/361* (2013.01); *F25D 2500/06* (2013.01); *F25D 2700/06* (2013.01)

(58) Field of Classification Search
CPC ............. F25D 29/00; F25D 2400/361; F25D 2500/06; F25D 2700/06; G06N 3/08; G06Q 10/087
See application file for complete search history.

(56) References Cited

U.S. PATENT DOCUMENTS 9,965,798 B1 * 5/2018 Vaananen ............... F25D 29/00
10,239,094 B2 * 3/2019 Zsigmond ................. B07C 5/34
(Continued)

FOREIGN PATENT DOCUMENTS

CN 107477971 A 12/2017
KR 10-2005-0077657 8/2005
(Continued)

OTHER PUBLICATIONS

European Office Action dated Jan. 13, 2022 in European Patent Application No. 19 882 836.0 (9 pages).
(Continued)

*Primary Examiner* — Thien M Le
*Assistant Examiner* — Asifa Habib
(74) *Attorney, Agent, or Firm* — STAAS & HALSEY LLP

(57) ABSTRACT

Disclosed herein is a food management system, a computing apparatus, and a refrigerator capable of dealing with frequent changes in a state of food stored in the refrigerator by tracking a state change of food in the refrigerator, without manual inputs from a user, and capable of expanding a service associated with food management, such as food purchase and capable of improving user convenience and accuracy of food management.

11 Claims, 43 Drawing Sheets

(56) References Cited

U.S. PATENT DOCUMENTS

| | | | |
|---|---|---|---|
| 11,015,859 B2* | 5/2021 | Lim | G06Q 10/0875 |
| 11,215,392 B2* | 1/2022 | Lim | F25D 29/00 |
| 11,521,391 B2* | 12/2022 | Kim | G06F 18/22 |
| 11,599,928 B2* | 3/2023 | Kim | H04N 23/60 |
| 2013/0067375 A1* | 3/2013 | Kim | G06F 3/04817 |
| | | | 715/769 |
| 2015/0292796 A1* | 10/2015 | Biotti | F25D 29/00 |
| | | | 62/62 |
| 2016/0063734 A1 | 3/2016 | Divakaran et al. | |
| 2016/0140146 A1* | 5/2016 | Wexler | G06F 16/5846 |
| | | | 707/741 |
| 2017/0219276 A1* | 8/2017 | Wang | H04N 23/90 |
| 2018/0026910 A1* | 1/2018 | Balle | G02B 6/3897 |
| 2018/0059881 A1* | 3/2018 | Agboatwalla | G06F 3/04883 |
| 2018/0335252 A1* | 11/2018 | Oh | F25D 29/00 |
| 2020/0125893 A1* | 4/2020 | Choi | G06V 10/82 |
| 2020/0404137 A1* | 12/2020 | Kang | H04N 7/18 |
| 2023/0169634 A1* | 6/2023 | Hu | G06T 5/50 |
| | | | 382/141 |
| 2024/0118020 A1* | 4/2024 | Park | F25D 23/028 |

FOREIGN PATENT DOCUMENTS

| | | |
|---|---|---|
| KR | 10-2012-0117464 | 10/2012 |
| KR | 10-2014-0139738 | 12/2014 |
| KR | 10-2015-0001921 | 1/2015 |
| KR | 10-2021-0031072 | 3/2021 |
| WO | 2018/020541 | 2/2018 |
| WO | WO 2018/143550 A1 | 8/2018 |

OTHER PUBLICATIONS

Supplementary European Search Report for European Application No. 19 88 2836 dated Jun. 16, 2021.
International Search Report dated Apr. 20, 2020 in International Patent Application No. PCT/KR2019/013989.
European Office Action dated Oct. 27, 2022 in European Patent Application No. 19 882 836.0 (94 pages).
Office Action dated Sep. 20, 2024 issued in Korean Application No. 10-2018-0134454.

* cited by examiner

FIG. 8A

| ID | Name | Image |
|---|---|---|
| 01 | Pineapple | Pineapple_1.jpg, Pineapple_2.jpg, |
| 02 | Grape | Grape_1.jpg, Grape_2.jpg, |
| 03 | Apple | Apple_1.jpg |
| 04 | Onion | Onion_1.jpg |

FIG. 8B

| ID | Name | Image |
|----|------|-------|
| 01 | Apple | Apple_2.jpg |

A  B  C  D

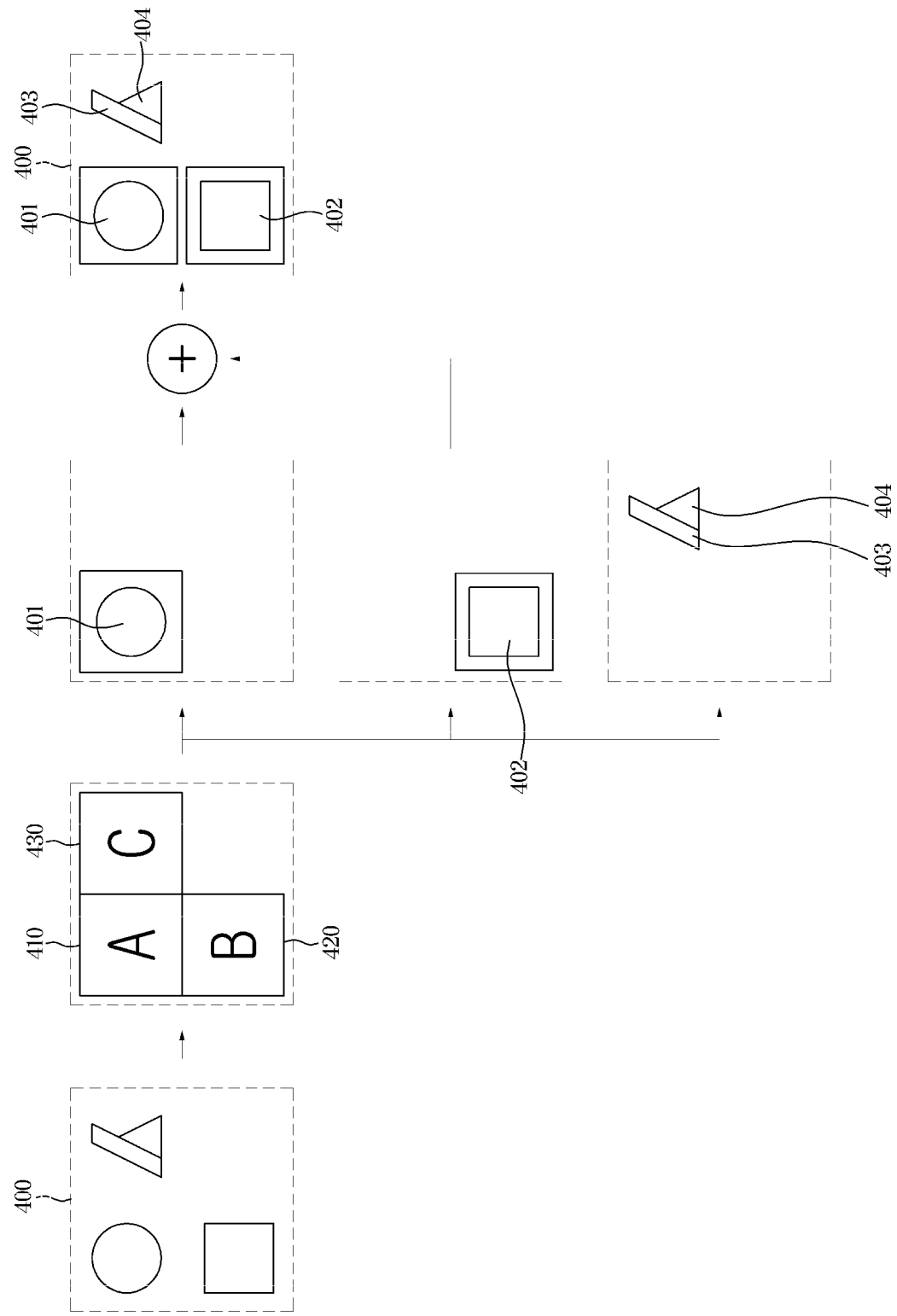

FIG. 24
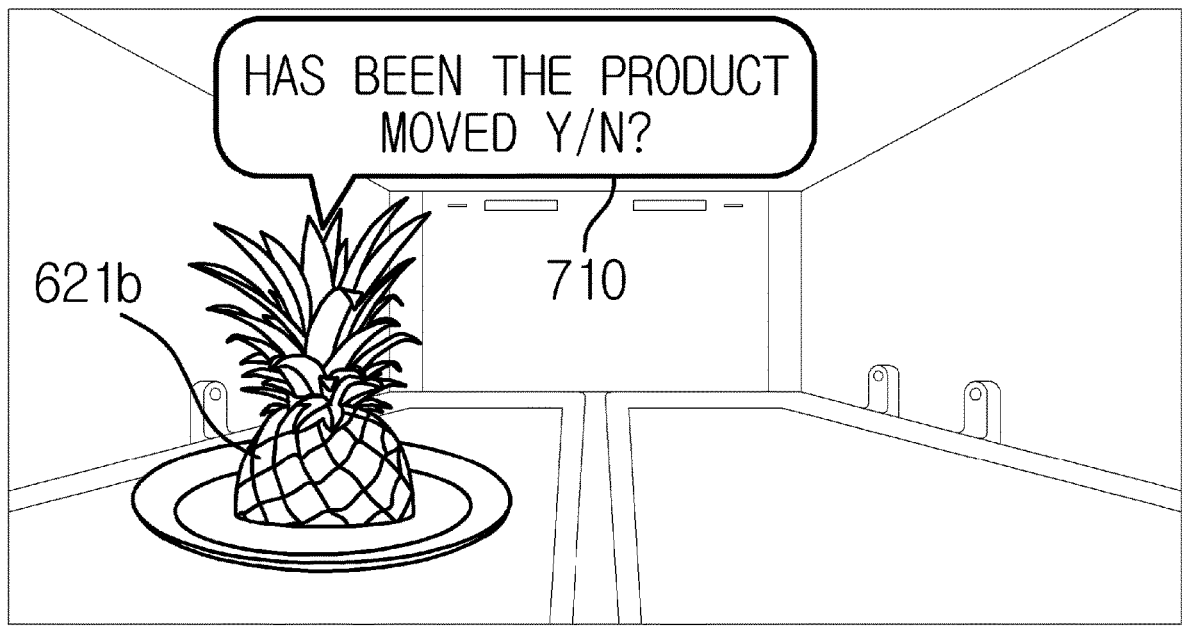
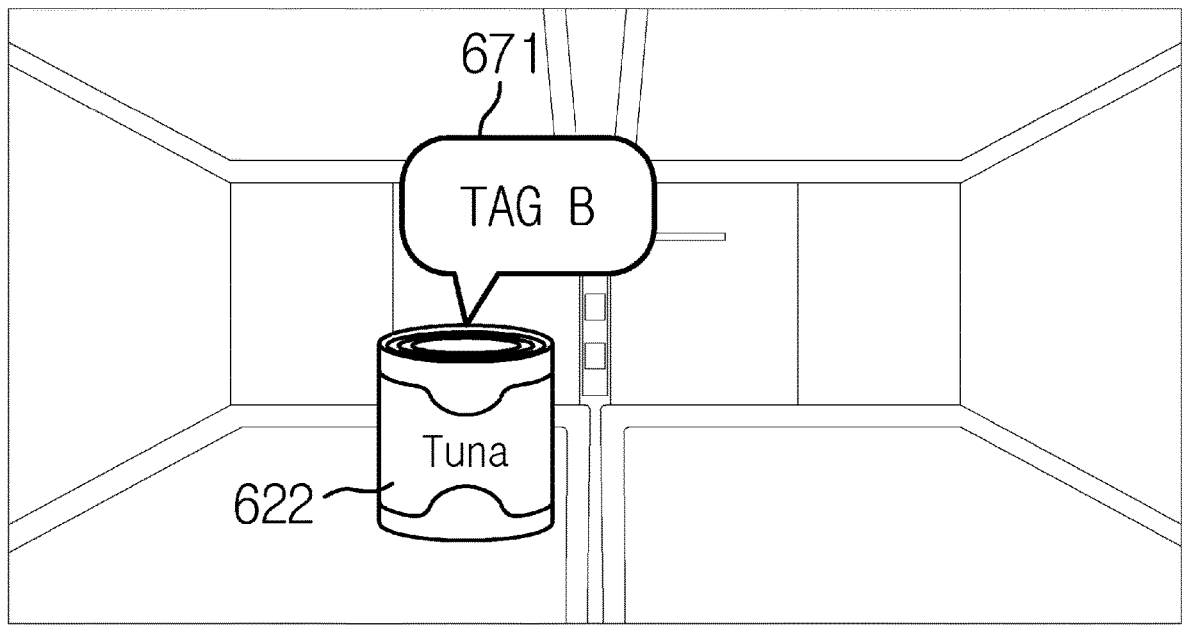

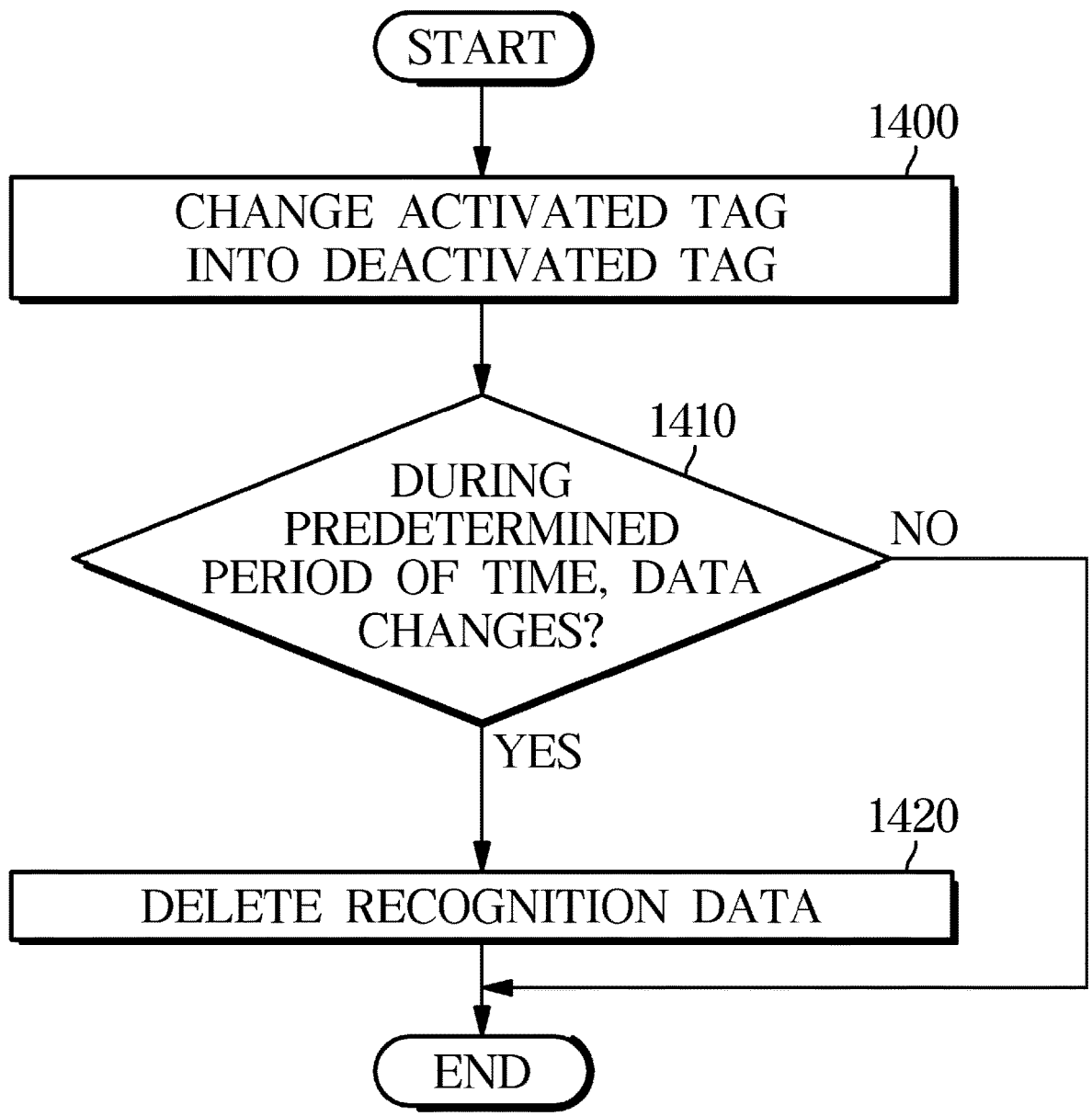

FOOD MANAGEMENT SYSTEM, COMPUTING APPARATUS AND REFRIGERATOR

CROSS-REFERENCE TO RELATED APPLICATIONS

This application is a U.S. National Stage Application, which claims the benefit under 35 U.S.C. § 371 of PCT International Patent Application No. PCT/KR2019/013989, filed Oct. 23, 2019 which claims the foreign priority benefit under 35 U.S.C. § 119 of Korean Patent Application No. 10-2018-0134454, filed Nov. 5, 2018, the contents of which are incorporated herein by reference.

TECHNICAL FIELD

The present disclosure relates to a refrigerator and a control method thereof, more related to a food management system, a computing apparatus, and a refrigerator capable of identifying food stored in the refrigerator and capable of generating a tag on the identified food.

BACKGROUND ART

A refrigerator is a device that stores objects, such as food and beverages, for a long period without spoiling. In general, the refrigerator includes a refrigerating compartment for refrigerating objects and a freezing compartment for freezing object.

The refrigerator maintains a temperature of a storage compartment at a target temperature by repeatedly performing the refrigeration cycle including compression-condensation-expansion-evaporation of the refrigerant. In other words, the refrigerator may supply air, which is cooled by an evaporator, which is provided corresponding to each storage compartment, based on the target temperature of each storage compartment (refrigerating compartment and/or freezing compartment), into each storage compartment and thus the refrigerator may maintain the temperature of the storage compartment at the target temperature.

Recently, refrigerators have included a display for displaying the temperature of the storage compartment and an operation mode of the refrigerator. Such a display provides a graphic user interface to a user, and enables the user to easily obtain information related to refrigerators and/or food using the graphic user interface and a touch panel, and the display also allows the user to intuitively input control commands. In response to a user input, which is inputted on the display, the refrigerator may display information of food stored in the storage compartment and may manage the information of the food.

However, in a conventional refrigerator, it is common for a user to directly input information about food stored in a storage compartment. For this reason, whenever a user puts a food item into a refrigerator or takes a food item out of the refrigerator, the user has to change information of the food stored in the storage compartment.

DISCLOSURE

Technical Problem

The present disclosure is directed to providing a food management system, a computing apparatus, and a refrigerator capable of dealing with frequent changes in a state of food stored in the refrigerator by tracking a state change of food in the refrigerator, without manual inputs from a user, and capable of expanding a service associated with food management, such as food purchase and capable of improving user convenience and accuracy of food management.

Technical Solution

One aspect of the present disclosure provides a computing apparatus including a communicator configured to receive an image of a storage compartment of a refrigerator from the refrigerator, a storage configured to store training data, an object recognition engine trained through the training data, and a list about food contained in the storage compartment, and a processing portion configured to identify food in the image of the storage compartment by using the trained object recognition engine, and configured to store recognition data, which is generated based on the identified product, in the list. The processing portion generates an image about the identified product and generates tag information on the food based on the identified food and the recognition data.

The processing portion may match the identified food with the recognition data included in the list, and generate the tag information generated by a result of matching, and the communicator may transmit the generated tag information and the generated image to the refrigerator.

The processing portion may compare first recognition data generated based on a first image of the storage compartment at a first point of time with second recognition data stored in the list, and modify the tag information based on a result of the comparison.

The processing portion may compare a reliability extracted from the result of the comparison with a predetermined reference value, and determine whether to activate a tag included in the tag information based on a result of the comparison.

In response to the reliability being equal to or greater than a predetermined first reference value, the processing portion may modify the tag information generated based on the second recognition data into tag information on food included in the first recognition data.

In response to the reliability being greater than or equal to a second reference value but less than the first reference value, the processing portion may control the refrigerator through the communicator to allow a user to generate a pop-up.

In response to the reliability being less than a third reference value, the processing portion may control the refrigerator through the communicator to generate a pop-up, and the processing portion may change the tag into deactivation based on a result of the pop-up that is received from a user through the communicator.

The processing portion may determine whether or not recognition data matching the deactivated tag changes during a predetermined period of time, and the processing portion may delete the recognition data matching the deactivated tag based on a result of determination.

The processing portion may receive data inputted by a user from the communicator, and add the data to the tag information, and the processing portion may move the data, which is included in the second recognition data, to the tag information included in the first recognition data.

Another aspect of the present disclosure provides a refrigerator including a body, a storage compartment provided inside the body, a camera provided in the body to image an inside of the storage compartment, a touch-sensitive display provided outside the body, a communicator configured to communicate with a computing apparatus, and a controller configured to control the camera to image the storage compartment, configured to obtain an image of the storage compartment from the camera, and configured to transmit the image of the storage compartment to the computing apparatus through the communicator. The controller receives tag information on food included in the image of the storage compartment from the computing apparatus through the communicator, generates a graphic user interface of the tag based on the received tag information, and displays the graphic user interface on the touch-sensitive display by superposing the graphic user interface on the image of the storage compartment.

The controller may receive data related to food identified from a user through the touch-sensitive display and transmit the data to the computing apparatus through the communicator.

The controller may generate a second graphic user interface displaying the data included in the tag information received from the computing apparatus, and display the second graphic user interface on the touch-sensitive display by superposing the second graphic user interface on the graphic user interface of the tag.

The controller may generate a pop-up asking whether to activate the tag information based on a request received from the computing apparatus, generate a graphic user interface of the pop-up, and display the graphic user interface of the pop-up on the touch-sensitive display.

The controller may determine whether to activate the graphic user interface of the tag already generated based on the tag information, and display a graphic user interface of the determined activated tag or the determined deactivated tag on the touch-sensitive display.

Another aspect of the present disclosure provides a food management system including a computing apparatus, a user equipment configured to communicate with the computing apparatus, and a refrigerator provided with a storage compartment and configured to transmit an image of the storage compartment to the computing apparatus. The computing apparatus includes a communicator, a storage configured to store training data, an object recognition engine trained through the training data, and a list about food contained in the storage compartment, and a processing portion configured to identify food in the image of the storage compartment by using the trained object recognition engine, and configured to store recognition data, which is generated based on the identified product, in the list. The processing portion generates an image about the identified product and generates tag information on the food based on the identified food and the recognition data.

The processing portion may match the identified food with the recognition data included in the list, and generate the tag information generated by a result of matching, and the communicator may transmit the generated tag information and the generated image to the refrigerator or the user equipment.

The processing portion may compare first recognition data generated based on a first image of the storage compartment at a first point of time with second recognition data stored in the list, and modify the tag information based on a result of the comparison.

The processing portion may compare a reliability extracted from the result of the comparison with a predetermined reference value, and determine whether to activate a tag included in the tag information based on a result of the comparison.

In response to the reliability being equal to or greater than a predetermined first reference value, the processing portion may modify the tag information generated based on the second recognition data into tag information on food included in the first recognition data.

In response to the reliability being greater than or equal to a second reference value but less than the first reference value, the processing portion may control the refrigerator or the user equipment through the communicator to allow a user to generate a pop-up.

In response to the reliability being less than a third reference value, the processing portion may control the refrigerator or the user equipment through the communicator to generate a pop-up, and the processing portion may change the tag into deactivation based on a result of the pop-up that is received from a user through the communicator.

The processing portion may determine whether or not recognition data matching the deactivated tag changes during a predetermined period of time, and the processing portion may delete the recognition data matching the deactivated tag based on a result of determination.

The user equipment or the refrigerator may display a graphic user interface of the tag together with the image of the storage compartment based on the modified tag information.

The processing portion may store the number of times, in which whether to activate the tag is determined, in the list, and the processing portion may proceed with a purchase guide of a product matching the tag information based on a predetermined period of time and the number of times.

Advantageous Effects

A food management system, a computing apparatus, and a refrigerator may deal with frequent changes in a state of food stored in the refrigerator by tracking a state change of food in the refrigerator, without manual inputs from a user.

A food management system, a computing apparatus, and a refrigerator may expand a service associated with food management, such as food purchase.

A food management system, a computing apparatus, and a refrigerator may improve user convenience and accuracy of food management.

DESCRIPTION OF DRAWINGS

FIGS. 8A and 8B illustrate data stored in the computing apparatus according to one embodiment of the present disclosure.

FIG. 13 illustrates another example in which the object recognition engine, which is included in the computing apparatus according to one embodiment of the present disclosure, identifies food.

FIG. 24 illustrates another state occurring according to one embodiment.

FIG. 28 is a flowchart illustrating a method for processing food in which a tag is changed according to another embodiment of the present disclosure.

MODES OF THE INVENTION

Figure 1:
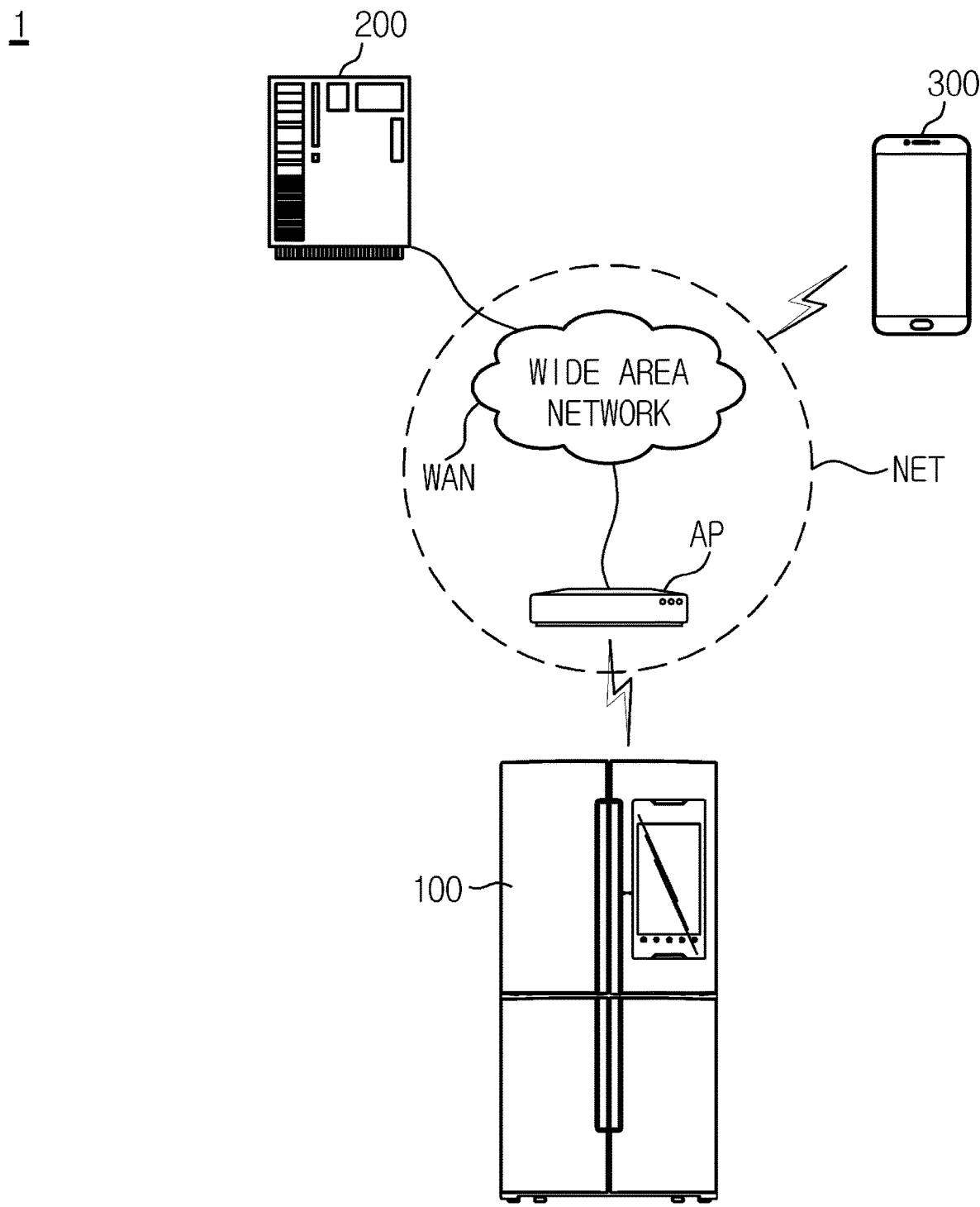
FIG. 1 illustrates a food management system according to one embodiment of the present disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Hereinafter exemplary embodiments of the present disclosure will be described in detail with reference to the accompanying drawings.

FIG. 1 illustrates a food management system according to one embodiment of the present disclosure.

As shown in FIG. 1, a food management system 1 includes a refrigerator 100 configured to store food, a computing apparatus 200 configured to identify (or recognize) food stored in the refrigerator 100, and a user equipment 300 configured to provide information related to the identified (or recognized) food to a user.

The refrigerator 100, the computing apparatus 200, and the user equipment 300 included in the food management system 1 may be connected to each other through a communication network NET. In this case, the communication network NET may include both a wired communication network and a wireless communication network. The wired communication network may include a communication network such as a cable network or a telephone network, and the wireless communication network may include a communication network that transmits and receives signals through radio waves. The wired communication network and the wireless communication network may be connected to each other. For example, the wired communication network may include a wide area network (WAN) such as Internet, and the wireless communication network may include an access point (AP) connected to a wide area network (WAN).

The refrigerator 100 may store food at a refrigerating or freezing temperature. For example, the refrigerator 100 may include a storage compartment in which food is stored and a cooling device configured to cool the storage compartment. The refrigerator 100 may supply cooled air to the storage compartment by using the cooling device in order to prevent the food stored in the storage compartment from being spoiled.

The refrigerator 100 may provide information related to food stored in the storage compartment to a user in response to a user's request. For example, the refrigerator 100 may image the storage compartment in which food is stored and obtain an image about the inside of the storage compartment. In order to obtain information related to food stored in the storage compartment, the refrigerator 100 may transmit the obtained inside image of the storage compartment to the computing apparatus 200 through the communication network NET. In addition, the refrigerator 100 may receive information related to food (food-related information) stored in the storage compartment from the computing apparatus 200, and display the received food-related information or transmit the received food-related information to the user equipment 300.

The computing apparatus 200 may process data from another device through a communication network NET, store the processed data, or transmit the processed data to another device. For example, the computing apparatus 200 may include a communication unit configured to communicate with other devices, a processing unit configured to process data, and a storage medium configured to store the processed data. The computing apparatus 200 may be called as server, client, workstation, personal computer, cloud, data drive, or data station.

The computing apparatus 200 may include object recognition configured to identify an object. For example, the computing apparatus 200 may include object recognition configured to identify an object included in an image using machine learning.

The computing apparatus 200 may receive the inside image of the storage compartment from the refrigerator 100 through the communication network NET, and may identify food (for example, food stored in the storage compartment) included in the inside image of the storage compartment. In addition, the computing apparatus 200 may store information related to the identified food or transmit information related to the identified food to the refrigerator 100 and/or the user equipment 300. The information related to the identified food may include an image of the identified food, a name of the identified food, a category of the identified food, and an expiration date of the identified food.

The user equipment 300 may process data from another device through the communication network NET, and may display the processed data to a user. In particular, the user equipment 300 may be carried by a user or may be placed in a user's home or office, and the user may easily access the user equipment 300. The user equipment 300 may be called in various ways, such as workstation, personal computer, terminal, portable telephone, smart phone, handheld device, or wearable device.

The user equipment 300 may receive information, which is related to food stored in the refrigerator 100, from the refrigerator 100 and/or the computing apparatus 200. The user equipment 300 may display information related to the food stored in the refrigerator 100.

For example, the user equipment 300 may display a name, an image, a category, and an expiration date of food stored in the refrigerator 100.

As mentioned above, the food management system 1 may obtain an image about the inside of the storage compartment by imaging the storage compartment of the refrigerator 100, and identify food contained in the inside image of the storage compartment. In other words, the food management system 1 may identify food stored in the storage compartment by using the inside image of the storage compartment. In addition, the food management system 1 may provide information related to food stored in the storage compartment to the user based on a result of recognition.

As a result, even when a user does not input information related to the food stored in the refrigerator 100, the refrigerator 100 may identify the food using the computing apparatus 200 and obtain information related to the stored food.

Hereinafter a configuration and operation of the refrigerator 100 included in the food management system 1 will be described.

Figure 2:
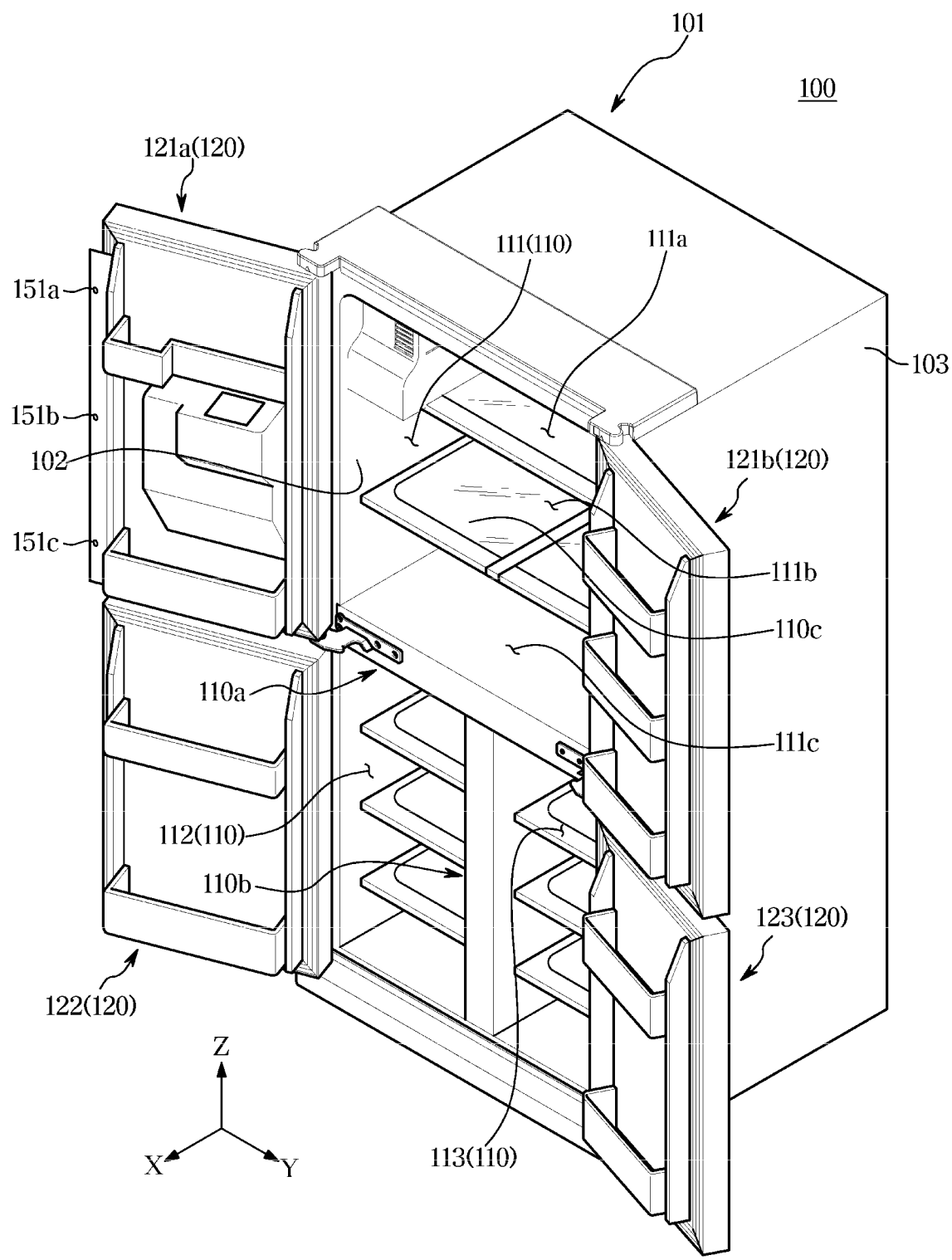
FIG. 2 illustrates an external appearance of a refrigerator according to one embodiment of the present disclosure.
Figure 3:
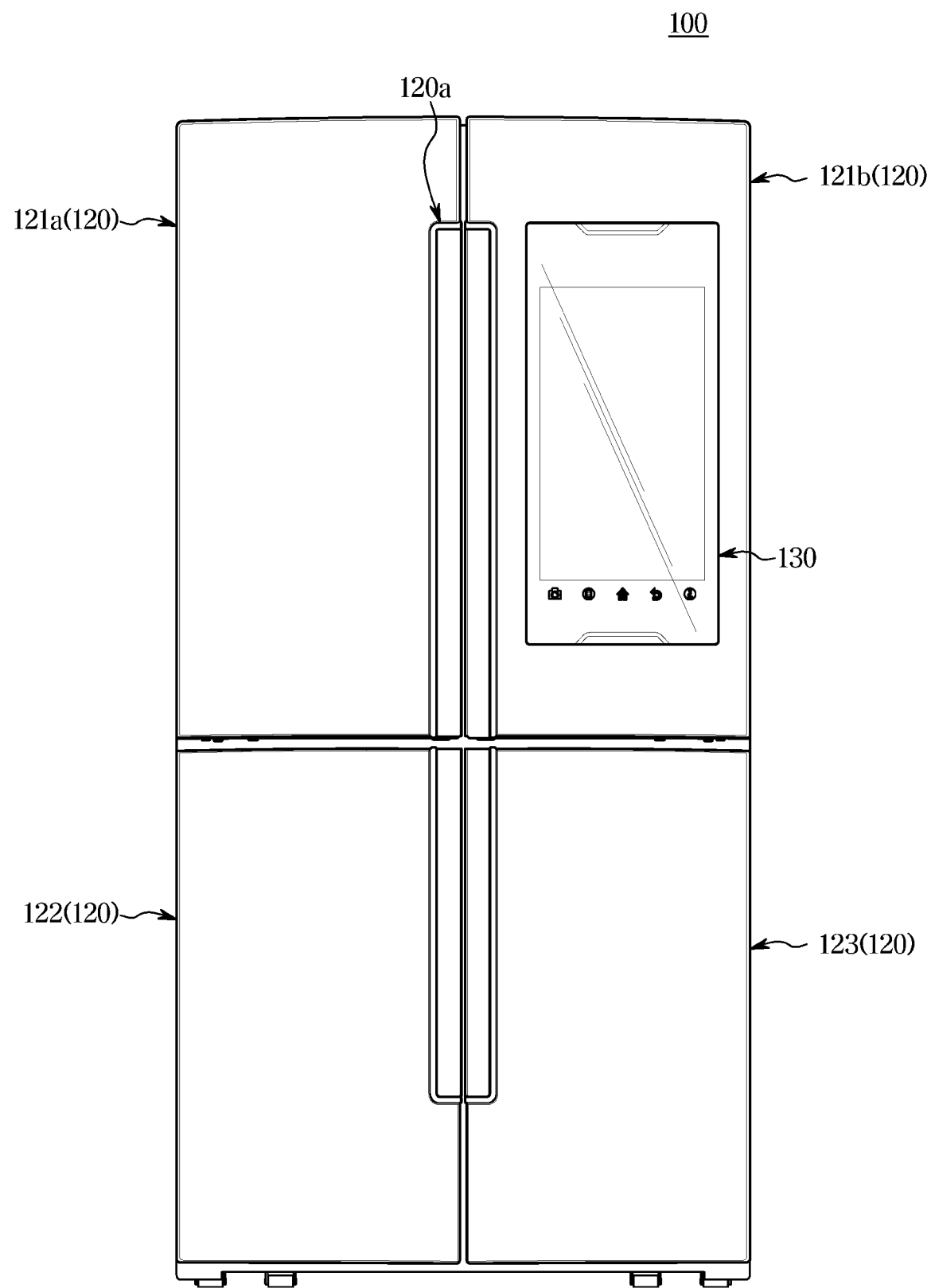
FIG. 3 illustrates a front surface of the refrigerator according to one embodiment of the present disclosure.
Figure 4:
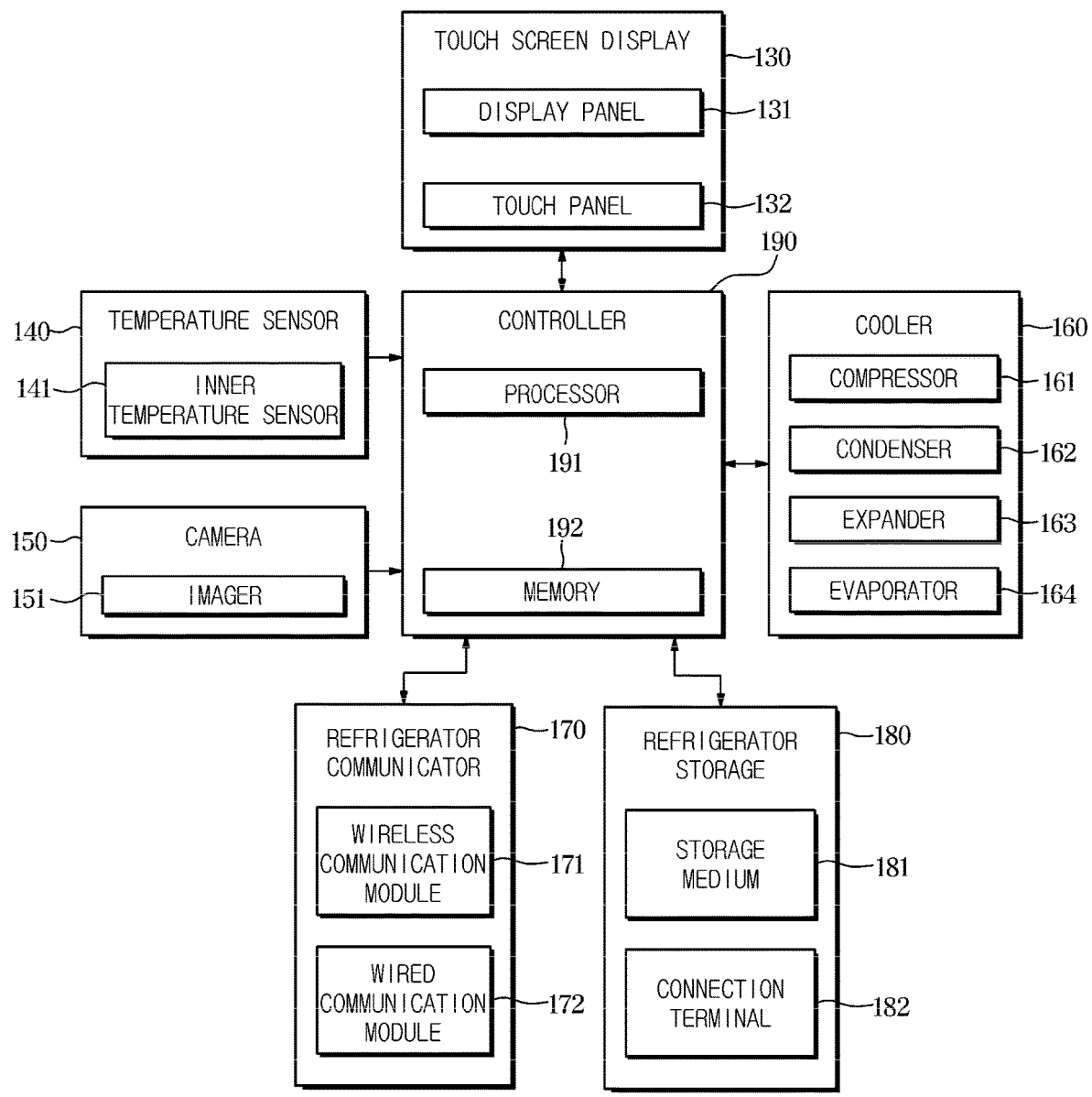
FIG. 4 illustrates a configuration of the refrigerator according to one embodiment of the present disclosure.
Figure 5:
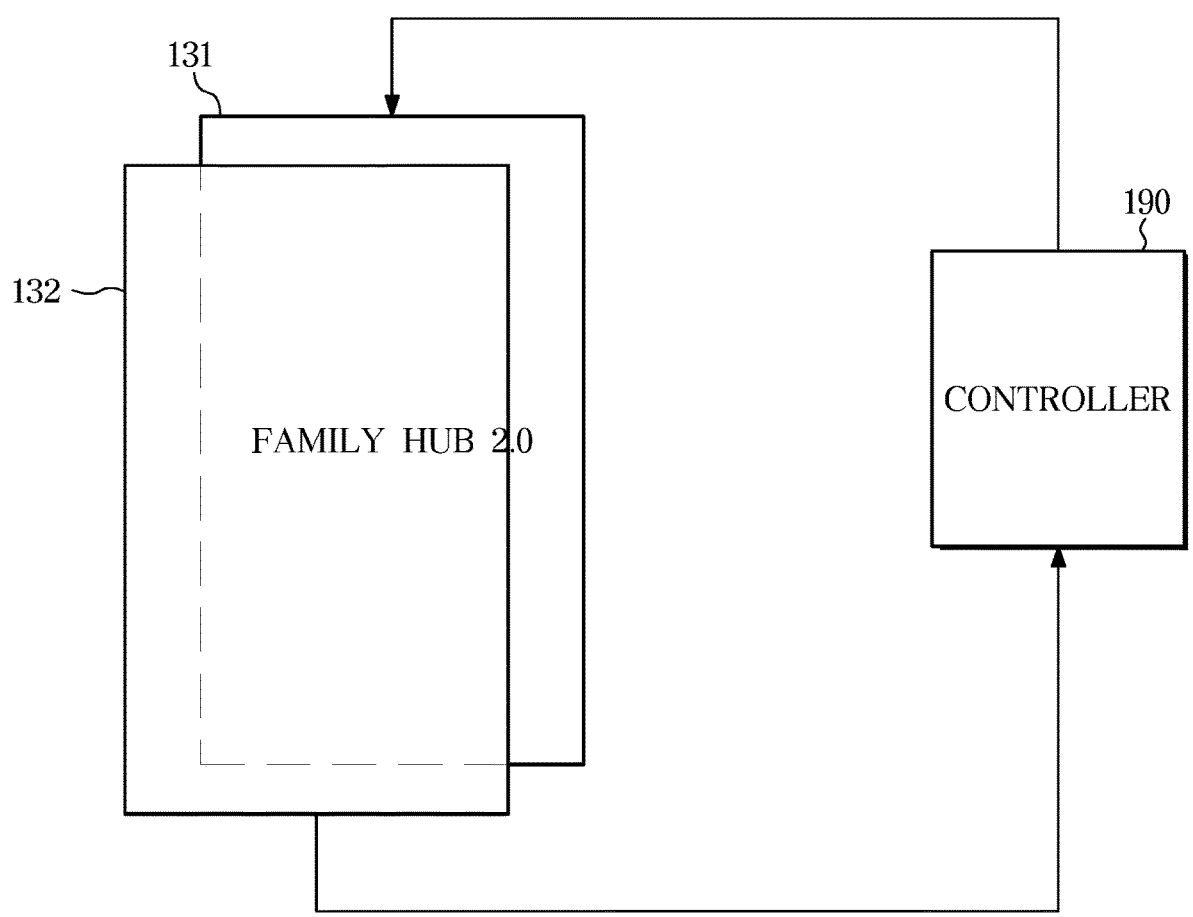
FIG. 5 illustrates a touch screen display included in the refrigerator according to one embodiment of the present disclosure.

FIG. 2 illustrates an external appearance of a refrigerator according to one embodiment of the present disclosure. FIG. 3 illustrates a front surface of the refrigerator according to one embodiment of the present disclosure. FIG. 4 illustrates a configuration of the refrigerator according to one embodiment of the present disclosure. FIG. 5 illustrates a touch screen display included in the refrigerator according to one embodiment of the present disclosure.

Referring to FIGS. 2, 3, 4 and 5, the refrigerator 100 may include a body 101 in which a front surface is open, a storage compartment 110 formed inside the body 101 and in which food is refrigerated and/or frozen, and a door 120 configured to open and close the open front surface of the body 101.

The body 101 may form an exterior of the refrigerator 100. The body 101 may include an inner case 102 forming the storage compartment 110 and an outer case 103 coupled to the outside of the inner case 102 to form the exterior. Insulation material (not shown) may be filled between the inner case 102 and the outer case 103 of the body 101 to prevent cold air being leaked from the storage compartment 110.

The storage compartment 110 may be divided into a plurality of spaces by a horizontal partition 110a and a vertical partition 110b. For example, as shown in FIG. 2, the storage compartment 110 may be divided into an upper storage compartment 111, a first lower storage compartment 112, and a second lower storage compartment 113.

A shelf 110c on which food is placed may be provided in the storage compartment 110. A storage space inside the storage compartment 110 may be partitioned by the shelf 110c. For example, the upper storage compartment 111 may be divided into a first storage space 111a, a second storage space 111b, and a third storage space 111c.

The storage compartment 110 may be opened and closed by the door 120. For example, as shown in FIG. 2, the upper storage compartment 111 may be opened and closed by a first upper door 121a and a second upper door 121b. The first lower storage compartment 112 may be opened and closed by a first lower door 122, and the second lower storage compartment 113 may be opened and closed by a second lower door 123.

A handle 120a may be provided on the door 120 to allow a user to easily open and close the door 120. The handle 121 may be formed to be elongated in a vertical direction along between the first upper door 121a and the second upper door 121b and between the first lower door 122 and the second lower door 123. Accordingly, in response to closing the door 120, the handle 120a may be viewed as being provided integrally.

In addition, as shown in FIG. 4, the refrigerator 1 may include a touch screen display 130, a temperature sensor 140, a camera 150, a cooler 160, a refrigerator communicator 170, a refrigerator storage 180, and a controller 190.

The touch screen display 130 may include a display panel 131 configured to display an image and a touch panel 132 configured to receive a touch input.

As illustrated in FIG. 5, the display panel 131 may convert image data received from the controller 190 into an optical signal that may be viewed by a user.

The display panel 131 may employ a liquid crystal display (LCD) panel, a light emitting diode (LED) panel, an organic light emitting diode (OLED) panel, a micro light emitting diode (uLED) panel, or a plasma display panel (PDP). However, the display panel 131 is not limited thereto, and the display panel 131 may employ various displays configured to visually display an optical image corresponding to image data.

As illustrated in FIG. 5, the touch panel 132 may receive a user touch input and output an electrical signal corresponding to the received touch input to the controller 190.

For example, the touch panel 132 may detect a user touch to the touch panel 132 based on a change in electrical resistance value or a change in capacitance, and the touch panel 132 may transmit an electrical signal corresponding to coordinates of the user touch point to the controller 190. The controller 190 may identify the coordinates of the user touch point based on the electrical signal received from the touch panel 132. Further, the controller 190 may identify the user input based on the coordinates of the user touch point.

The touch panel 132 may be located on a front surface of the display panel 131. In other words, the touch panel 132 may be provided on a surface on which an image is displayed. Accordingly, the touch panel 132 may be formed of a transparent material to prevent an image, which is displayed on the display panel 131, from being distorted.

The touch panel 132 may employ a resistive touch panel or a capacitive touch panel. However, the touch panel 132 is not limited thereto, and the touch panel 132 may employ various touch panels configured to detect a user touch or approach, and output various electrical signals corresponding to coordinates of the detected touch point or coordinates of the access point.

As mentioned above, the touch screen display 130 may receive a touch input from a user, transmit the received touch input to the controller 190, and display an image of the controller 190 in response to the user touch input. In other words, the touch screen display 130 may interact with a user.

The touch screen display 130 may be installed on the door 120 for user convenience. For example, as shown in FIG. 3, the touch screen display 130 may be installed on the second upper door 121*b*. Hereinafter the touch screen display 130 installed on the second upper door 121*b* will be described, but the installation position of the touch screen display 130 is not limited to the second upper door 121*b*. For example, the touch screen display 130 may be installed on any place that may be viewed by a user, such as the first upper door 121*a*, the first lower door 122, the second lower door 123, and the outer case 103 of the body 10.

In addition, the touch screen display 130 may be provided with a wake up function that is automatically activated in response to a user approach within a certain range. For example, in response to that a user approaches within a certain range, the touch screen display 130 may be activated. In other words, the touch screen display 130 may be turned on. In response to that a certain time elapses after the user is out of the certain range, the touch screen display 130 may be deactivated. In other words, the touch screen display 130 may be turned off.

The temperature sensor 140 may include inner temperature sensors 141 provided inside the storage compartment 110 and configured to detect a temperature of the inside of the storage compartment 110.

Each of the inner temperature sensors 141 may be respectively installed in each of the plurality of storage compartments 111, 112, and 112 so as to detect the temperature of each of the plurality of storage compartments 111, 112, and 113, and to output an electrical signal corresponding to the detected temperature to the controller 190. Each of the inner temperature sensors 141 may include a thermistor in which an electrical resistance changes according to a temperature.

The camera 150 may be installed inside the storage compartment 110 to obtain an inside image of the storage compartment 110. For example, as shown in FIG. 2, the camera 150 may be installed inside the door 120 and image the storage compartment 110 from the inside of the door 120 toward the inside of the storage compartment 110. Accordingly, the camera 150 may image the inside of the storage compartment 110 in a direction substantially the same as the direction of the user's gaze.

The camera 150 may include an imager 151 configured to image an image and convert the image into an electrical signal. The imager 151 may include a plurality of photodiodes configured to convert an optical signal into an electrical signal, and the plurality of photodiodes may be arranged in two dimensions. The imager 151 may include a charge-coupled device (CCD) image sensor or a complementary metal-oxide-semiconductor (CMOS) image sensor.

The camera 150 may include a plurality of imagers 151*a*, 151*b*, and 151*c* to image the inside of the storage compartment 110 partitioned by the shelf 110*c*. For example, the camera 150 may include the first imager 151*a* configured to image the first storage space 111*a*, the second imager 151*b* configured to image the second storage space 111*b*, and the third imager 151*c* configured to image the third storage space 111*c* of the upper storage compartment 111.

Particularly, in a case in which the food is stored in the storage compartment 110, the inside image of the storage compartment 110 imaged by the camera 150 may include an image of the food stored in the storage compartment 110.

The camera 150 may transmit the imaged image to the controller 190. Particularly, the camera 150 may transmit the inside image of the storage compartment 110 including the image of the food to the controller 190.

The cooler 160 may supply cold air to the storage compartment 110. Particularly, by using the evaporation of the refrigerant, the cooler 160 may maintain the temperature of the storage compartment 110 within a range designated by the user.

The cooler 160 may include a compressor 161 configured to compress a gaseous refrigerant, a condenser 162 configured to convert the compressed gaseous refrigerant to a liquid state, an expander 163 configured to decompress the liquid refrigerant, and an evaporator 164 configured to convert the decompressed liquid refrigerant state into a gas state.

The cooler 160 may cool the air in the storage compartment 110 by using a phenomenon in which the liquid refrigerant is converted into a gaseous state and absorbs thermal energy of the adjacent air.

However, the cooler 160 is not limited to including the compressor 161, the condenser 162, the expander 163, and the evaporator 164.

For example, the cooler 160 may include a Peltier element using Peltier effect. The Peltier effect means that when a current flows through a contact surface, in which different types of metals come into contact, heat is evolved at one metal and absorbed at the other metal. The cooler 160 may cool the air in the storage compartment 110 using the Peltier element.

As another example, the cooler 160 may include a magnetic cooling device using magneto-caloric effect. The magneto-caloric effect means that when a specific substance (magnetic caloric substance) is magnetized, heat is released, and when a specific substance (magnetic caloric substance)

is demagnetized, heat is absorbed. The cooler 160 may cool the air in the storage compartment 110 using the magnetic cooling device.

The refrigerator communicator 170 may exchange data with the computing apparatus 200 and/or the user equipment 300. For example, the refrigerator communicator 170 may transmit the inside image of the storage compartment imaged by the camera 150 to the computing apparatus 200, and receive food-related information included in the inside image of the storage compartment from the computing apparatus 200.

The refrigerator communicator 170 may include a wired communication module 172 configured to exchange data with the computing apparatus 200 and/or the user equipment 300 in a wired manner, and a wireless communication module 171 configured to exchange data with the computing apparatus 200 and/or the user equipment 300 in a wireless manner.

The wired communication module 172 may access the wired communication network and communicate with the computing apparatus 200 and/or the user equipment 300 through the wired communication network. For example, the wired communication module 172 may access a wired communication network through Ethernet (IEEE 802.3 standard), and receive data from the computing apparatus 200 and/or the user equipment 300 through the wired communication network.

The wireless communication module 171 may communicate with a base station or an access point (AP) in the wireless manner, and may access the wired communication network through the base station or the access point. Through the base station or the access point, the wireless communication module 171 may also communicate with the computing apparatus 200 and/or the user equipment 300 connected to the wired communication network. For example, the wireless communication module 171 wirelessly communicates with the access point (AP) using Wi-Fi™ (IEEE 802.11 standard), or wirelessly communicates with the base station using CDMA, WCDMA, GSM, Long Term Evolution (LET), or Wi-Bro. The wireless communication module 171 may also receive data from the computing apparatus 200 and/or the user equipment 300 via the base station or the access point.

In addition, the wireless communication module 171 may directly communicate with the computing apparatus 200 and/or the user equipment 300. For example, the wireless communication module 171 may wirelessly receive data from the computing apparatus 200 and/or the user equipment 300 using Wi-Fi, Bluetooth™ (IEEE 802.15.1 standard), or ZigBee™ (IEEE 802.15.4 standard).

As mentioned above, the refrigerator communicator 170 may exchange data with the computing apparatus 200 and/or the user equipment 300, and output data received from the computing apparatus 200 and/or the user equipment 300 to the controller 190.

The refrigerator storage 180 may include a storage medium 181 configured to store programs and/or data, and a connection terminal 182 configured to be connectable to an external storage medium in which programs and/or data are stored. The program may include a plurality of instructions that is combined to perform a specific function, and the data may be processed by a plurality of instructions included in the program. In addition, the program and/or data may include a system program and/or system data directly related to the operation of the refrigerator 100, and an application program and/or application data that provides convenience and fun to the user.

The storage medium 181 may store programs and/or data in the form of files. For example, the storage medium 181 may store programs and/or data in a file format such as "*.exe", "*.jpg" or "*.mpg".

The storage medium 181 may store content data electrically, magnetically, or optically. For example, the storage medium 181 may include a solid stat driver (SSD) or a hard disk drive (HDD) or an optical disk drive (ODD).

The storage medium 181 may output a program and/or data to the controller 190 in response to a loading command of the controller 190.

The connection terminal 182 may be connected to an external storage medium configured to store programs and/or data. For example, the connection terminal 182 may include a Universal Serial Bus (USB) terminal, and may be connectable to an external USB storage medium.

In the same manner as the storage medium 181 of the refrigerator 100, the external storage medium may store programs and/or data in the form of files, and may store programs and/or data electrically, magnetically, or optically. In addition, the external storage medium may output programs and/or data to the controller 190 through the connection terminal 182 in response to a loading command of the controller 190.

As mentioned above, the refrigerator storage 180 may store programs and/or data, and may output the stored programs and/or data to the controller 190. In other words, the refrigerator storage 180 may store programs and/or data executed for the controller 190 to perform the operations described below.

The controller 190 includes a memory 192 configured to load and memorize programs and/or data stored in the refrigerator storage 180, and a processor 191 configured to process user input data of the touch screen display 130 and communication data of the refrigerator communicator 170 according to the program and/or data stored in the memory 192. The controller 190 may include hardware, such as the memory 192 and the processor 191 and further include software, such as programs and/or data that is memorized in the memory 192 and processed by the processor 191.

The memory 192 may memorize programs and/or data for controlling components included in the refrigerator 100 and may memorize temporary data that is generated upon controlling the components included in the refrigerator 100.

For example, the memory 192 may memorize programs and/or data for controlling the operation of the cooler 160 based on the detection result of the temperature sensor 140, and may temporarily memorize the detection result of the temperature sensor 140. The memory 192 may memorize programs and/or data for controlling the operation of the touch screen display 130, and may temporarily memorize an image displayed on the touch screen display 130 and a touch input (user input) that is inputted on the touch screen display 130. The memory 192 may memorize programs and/or data for controlling an imaging operation of the camera 150 based on the opening and closing of the door 120, and may temporarily memorize an image imaged by the camera 150. The memory 192 may memorize programs and/or data for controlling a communication operation of the refrigerator communicator 170 and may temporarily memorize communication data that is transmitted and received by the refrigerator communicator 170. Further, the memory 192 may memorize programs and/or data for the refrigerator 100 to perform an operation described below.

The memory 192 may include a nonvolatile memory such as a Read Only Memory (ROM) or a flash memory for storing data for a long period of time, and a volatile memory such as a Static Random Access Memory (S-RAM) or Dynamic Random Access Memory (D-RAM) for temporarily storing data.

The processor 191 may process a touch input of the touch screen display 130 and/or communication data of the refrigerator communicator 170 according to programs and/or data memorized/stored in the memory 192. The processor 191 may generate a control signal for controlling the operation of the camera 150, the touch screen display 130 and/or the operation of the refrigerator communicator 170.

For example, the processor 191 may receive temperature information of the storage compartment 110 from the temperature sensor 140, and generate a cooling control signal for controlling the operation of the cooler 160 based on the temperature information of the storage compartment 110. The processor 191 may receive a user touch input from the touch screen display 130 and transmit a display control signal and image data for displaying an image on the touch screen display 130 to the touch screen display 130 in response to the user touch input. The processor 191 may generate an imaging control signal to allow the camera 150 to image the inside of the storage compartment 110 in response to closing the opened door 120, and the processor 191 may receive the inside image of the storage compartment 110. In response to receiving the inside image of the storage compartment 110 from the camera 150, the processor 191 may generate a communication control signal for allowing the refrigerator communicator 170 to transmit the inside image of the storage compartment 110 to the computing apparatus 200. In response to receiving information related to food stored in the storage compartment 110 from the computing apparatus 200 through the refrigerator communicator 170, the processor 191 may generate a display control signal for displaying the food related information on the touch screen display 130. Further, the processor 191 may generate a control signal for the refrigerator 100 to perform an operation described below.

The processor 191 may include a core configured to perform logical operations and arithmetic operations, and a register configured to memorize calculated data.

As mentioned above, the controller 190 may control the cooler 160, the touch screen display 130, and the refrigerator communicator 170 based on the temperature of the storage compartment 110 through the temperature sensor 140, the user touch input through the touch screen display 130, and/or the communication data through the refrigerator communicator 170.

As mentioned above, the controller 190 may include a plurality of processors and a plurality of memories as well as the processor and the memory configured to control all components contained in the refrigerator 100. For example, the controller 190 may be separately provided with a processor and memory configured to control the operation of the temperature sensor 140/the cooler 160, a processor and memory configured to control the operation of the touch screen display 130, and a processor and memory configured to control the operation of the refrigerator communicator 170.

Hereinafter a configuration and operation of the computing apparatus 200 included in the food management system 1 will be described.

Figure 6:
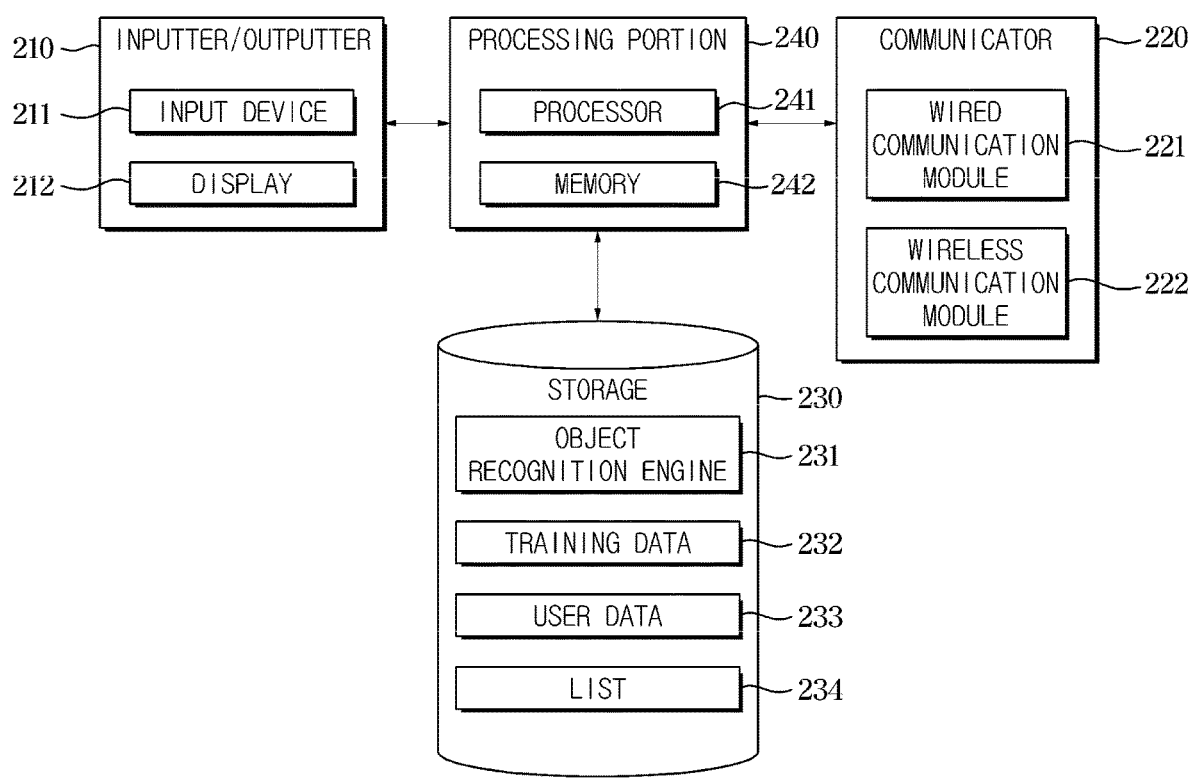
FIG. 6 illustrates a configuration of a computing apparatus according to one embodiment of the present disclosure.
Figure 7:
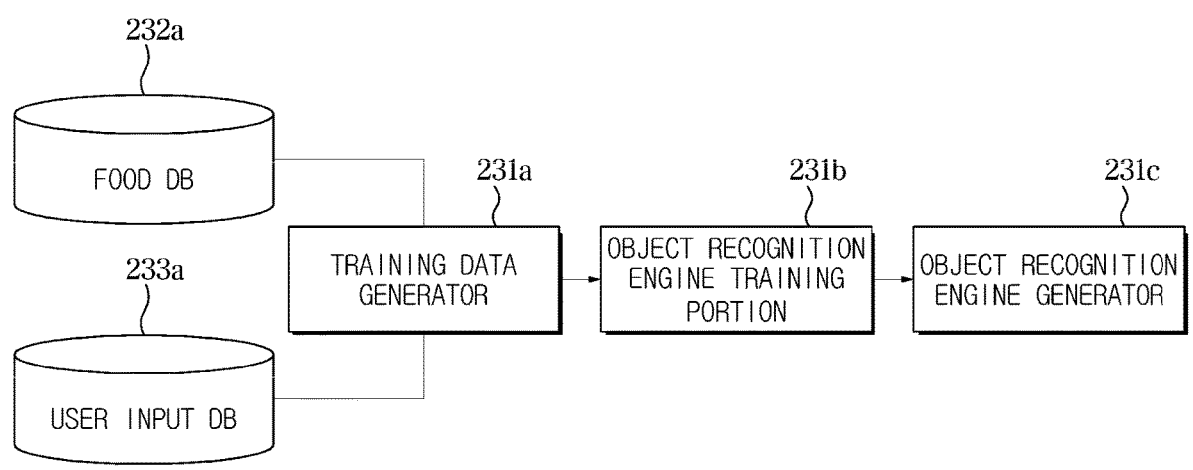
FIG. 7 illustrates a configuration of an object recognition engine in the computing apparatus according to one embodiment of the present disclosure.
Figure 8B:
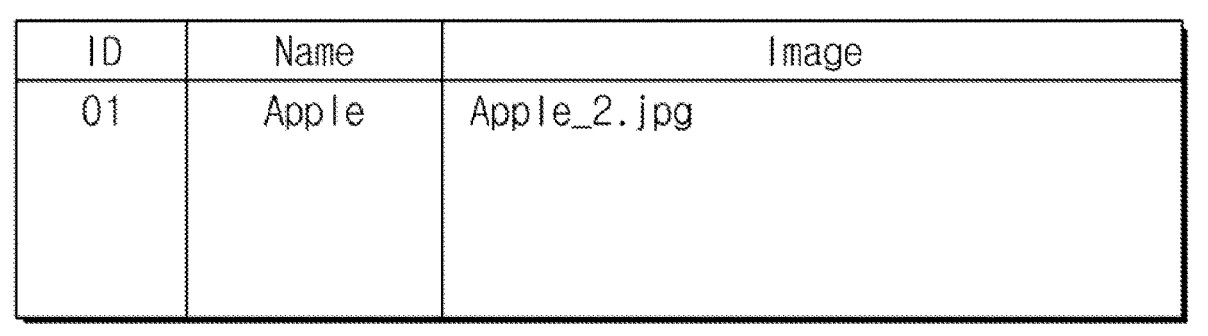
Figure 9:
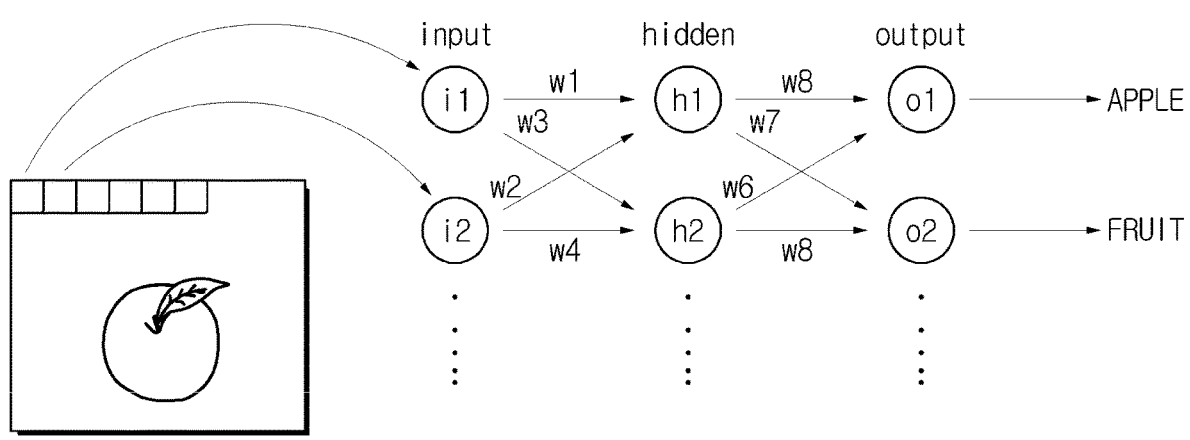
FIG. 9 illustrates an example of a learning engine, which is contained in the computing apparatus, for identifying objects according to one embodiment of the present disclosure.
Figure 10A:
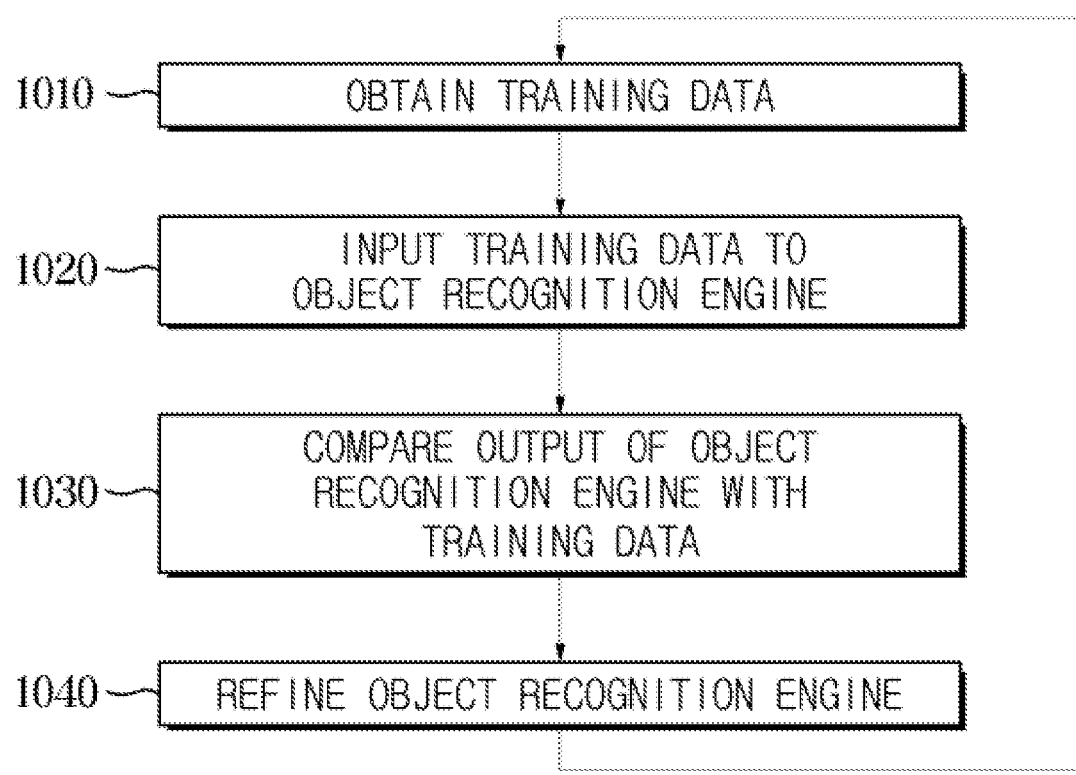
FIGS. 10A and 10B illustrate an example of machine learning of the computing apparatus for identifying objects according to one embodiment of the present disclosure.
Figure 10B:
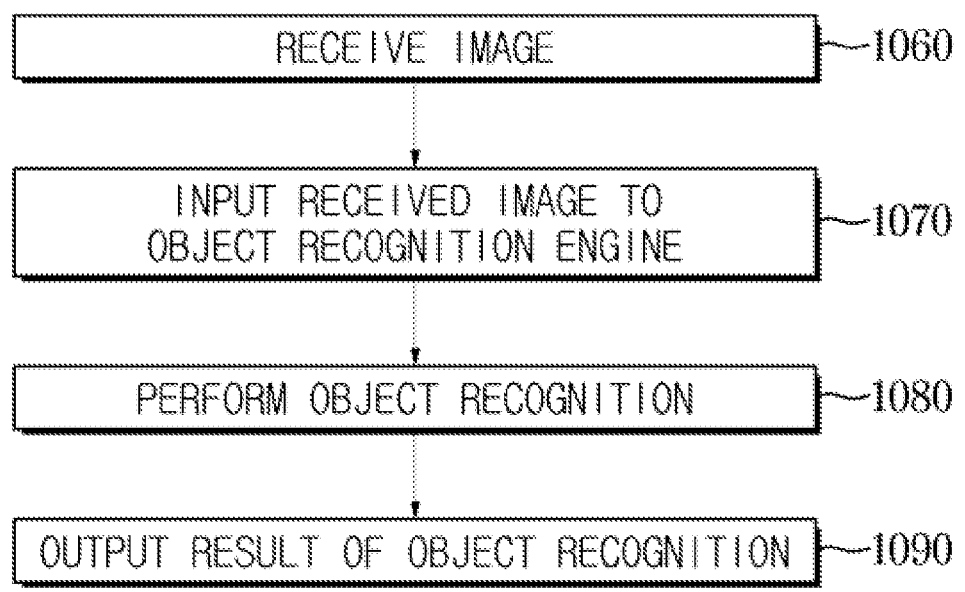

FIG. 6 illustrates a configuration of a computing apparatus according to one embodiment of the present disclosure. FIG. 7 illustrates a configuration of an object recognition engine in the computing apparatus according to one embodiment of the present disclosure. FIGS. 8A and 8B illustrate data stored in the computing apparatus according to one embodiment of the present disclosure. FIG. 9 illustrates an example of a learning engine, which is contained in the computing apparatus, for identifying objects according to one embodiment of the present disclosure. FIGS. 10A and 10B illustrate an example of machine learning of the computing apparatus for identifying objects according to one embodiment of the present disclosure.

Referring to FIGS. 6, 7, 8, 9 and 10, the computing apparatus 200 may include an inputter/outputter 210, a communicator 220, a storage 230, and a processing portion 240.

The inputter/outputter 210 may include an input device configured to receive a control command for the computing apparatus 200 from a user and/or an administrator, and a display device configured to display operation information of the computing apparatus 200.

For example, the inputter/outputter 210 may include a hardware input device 211 such as various buttons or a switch, a pedal, a keyboard, a mouse, a track-ball, various levers, a handles or a stick for user and/or administrator input, or may include a graphical user interface (GUI) such as a touch pad, that is, a software input device 211 for user and/or administrator input. In addition, the inputter/outputter 210 may include a display 212 configured to display the operation of the computing apparatus 200.

Particularly, the inputter/outputter 210 may include a terminal provided separately from the computing apparatus 200. For example, the inputter/outputter 210 may include a fixed terminal including a keyboard and a monitor, or a portable terminal including a keyboard, a touch pad, a display, and a touch screen display.

The communicator 220 may exchange data with the refrigerator 100 and/or the user equipment 300. For example, the communicator 220 may receive the inside image of the storage compartment from the refrigerator 100 and transmit information related to food included in the inside image of the storage compartment to the refrigerator 100 and/or the user equipment 300.

The communicator 220 may include a wired communication module 221 configured to exchange data with the refrigerator 100 and/or the user equipment 300 in a wired manner, and a wireless communication module 222 configured to exchange data with the refrigerator 100 and/or the user equipment 300 in a wireless manner. A configuration and operation of the wired communication module 221 and the wireless communication module 222 may be the same as those of the refrigerator 100.

As mentioned above, the communicator 220 may exchange data with the refrigerator 100 and/or the user equipment 300, and output data received from the refrigerator 100 and/or the user equipment 300 to the processing portion 240.

The storage 230 may store programs and/or data for processing a request from the refrigerator 100 and/or the user equipment 300.

For example, the storage 230 may include an object recognition engine 231 configured to identify an object based on images, training data 232 configured to train the object recognition engine 231, user data 233 configured to refine the object recognition engine 231 according to modification of user, and a list 234 about the identified products.

The object recognition engine 231 may identify an object in an image using supervised learning or unsupervised learning. For example, by pre-learning or post-learning, the object recognition engine 231 may identify food included in the image and output food-related information such as the name of the identified food.

The object recognition engine 231 may include supervised learning that performs learning under supervision, unsupervised learning that performs learning without supervision, and reinforcement learning that performs learning by reward without supervision. For better understanding, it is assumed that the object recognition engine 231 includes supervised learning.

The object recognition engine 231 may include various learning algorithms for object recognition through an image. For example, the object recognition engine 231 may include a neural network algorithm, a support vector machine (SVM) algorithm, an AdaBoost algorithm, and a random forest algorithm.

The object recognition engine 231 may be trained in advance by the training data 232. In addition, the object recognition engine 231 may be refined by the user data 233 after the fact.

The training data 232 may include an image and a name of an object corresponding to the image. For example, the training data 232 may include a file containing "image of an apple" and a food name "apple" corresponding the image of the apple.

In addition, the user data 233 may include an image of an object and a name of an object modified by the user of the refrigerator 100. For example, the user data 233 may include a file containing "image of an apple" and a food name "apple" modified by the user.

For example, as shown in FIGS. 7 and 8, the storage 230 may include a food database 232a and a user input database 233a.

The food database 232a may include the training data 232 for training the object recognition engine 231. The training data 232 of the food database 232a may be stored in advance by the designer, and the object recognition engine 231 may be initially trained by the training data 232 of the food database 232a.

The training data 232 of the food database 232a may include a name of food and an image of the corresponding food. For example, as shown in FIG. 8A, the food database 232a may include "pineapple" and at least one image representing a pineapple (pineapple_1.jpg, and pineapple_2jpg), "grape" and at least one image (Grape_1.jpg, and Grape_2.jpg) representing a grape, and "apple" and at least one image (Apple_1) representing an apple.

The user input database 233a may include the user data 233 inputted or modified by a user. In response to that the user data 233 is inputted by the user, the object recognition engine 231 may be refined by the user data 233.

The user data 233 of the user input database 233a may include the name of the food inputted by the user and images corresponding to the name of the food modified by the user. For example, as shown in FIG. 8B, the user input database 233a may include "apple" inputted by the user and an image corresponding to the modified apple (Apple_2.jpg).

In order to refine the object recognition engine 231 using the user data 233 of the user input database 233a, the object recognition engine 231 of the storage 230 may further include a training data generator 231a, an object recognition engine training portion 231b and an object recognition engine generator 231c.

The training data generator 231a may generate training data for refining the object recognition engine 231 using the existing training data 232 and the user data 233 inputted by the user. For example, the training data generator 231a may mix the training data 232 and the user data 233, and may adjust a ratio between the training data 232 and the user data 233.

The object recognition engine training portion 231b may refine the object recognition engine 231 using training data newly generated by the training data generator 231a. As described below, the object recognition engine training portion 231b may input a food image from the training data to the object recognition engine 231, compare the food name corresponding to the food image with a food name output from the object recognition engine 231, and adjust coefficients included in the object recognition engine 231 according to the comparison result.

The object recognition engine generator 231c may generate the object recognition engine 231 refined by the object recognition engine training portion 231b.

As mentioned above, the storage 230 may store programs and/or data, and may output the stored programs and/or data to the processing portion 240. In other words, the storage 230 may store programs and/or data executed for the processing portion 240 to perform an operation described below. For example, the storage 230 may store the object recognition engine 231, the training data 232, the user data 233, and the list 234 for the object recognition.

The list 234 may include recognition data, such as a name of the food identified based on the image of the storage compartment of the refrigerator and coordinates at which the identified food is located in in the storage compartment 110. In addition, the list 234 may further include tag information to be described later with reference to other drawings below. The tag information includes an image of the identified food generated by the processing portion 240 and activation information regarding whether or not a tag is activated.

The storage 230 may store the list 234 including recognition data generated based on the inside image of the storage compartment 110, which is imaged at a first point of time, and then the storage 230 may provide the list 234 to the processing portion 240 to be compared with an inside image of the storage compartment 110 that is imaged at a second point time.

The processing portion 240 may include a memory 242 configured to load programs and/or data stored in the storage 230 and memorize the programs and/or data, and a processor 241 configured to process data received from the refrigerator 100 and/or the user equipment 300 according to the programs and/or data stored in the memory 242. The processing portion 240 may include hardware, such as the memory 242 and the processor 241 and further include software, such as programs and/or data that is memorized in the memory 242 and processed by the processor 241.

The memory 242 may memorize programs and/or data for processing data received from the refrigerator 100 and/or the user equipment 300, and store temporary data that is generated upon processing the data received from the refrigerator 100 and/or the user equipment 300.

For example, the memory 242 may memorize the object recognition engine 231 that is not trained, and memorize programs and/or data for training the untrained object recognition engine 231 by using the training data 232 stored in the storage 230. The memory 242 may memorize the trained object recognition engine 231 and memorize programs and/or data for identifying an object in an image based on image data by using the trained object recognition engine 231. Further, the memory 242 may memorize programs and/or data for the computing apparatus 200 to perform an operation described below.

The memory 242 may include a nonvolatile memory, such as ROM and flash memory for storing data for a long period of time, and a volatile memory, such as S-RAM and D-RAM for temporarily storing data.

The processor 241 may process data received from the refrigerator 100 and/or the user equipment 300 according to programs and/or data memorized/stored in the memory 242, and generate a control signal for transmitting a result of the processing to the refrigerator 100 and/or the user equipment 300.

For example, the processor 241 may train the untrained object recognition engine 231 stored in the memory 242. Particularly, the processor 241 may input the training data 232 to the untrained object recognition engine 231, compare the output of the object recognition engine 231 with the training data 232, and refine (train) the object recognition engine 231.

Further, the processor 241 may identify an object in the image using the trained object recognition engine 231 stored in the memory 242. Particularly, the processor 241 may input the inside image of the storage compartment, which is transmitted from the refrigerator 100, to the trained object recognition engine 231, and identify food contained in the inside image of the store compartment based on the output of the object recognition engine 231. In other words, the processor 241 may identify food stored in the storage compartment 110 by using the trained object recognition engine 231, and output information related to the identified food. Further, the processor 241 may generate a control signal for the computing apparatus 200 to perform an operation described below.

The processor 241 may include a core configured to perform logical operations and arithmetic operations, and a register configured to store calculated data.

As mentioned above, the processing portion 240 may train the object recognition engine 231 that is not trained, and may identify the object in the input image using the trained object recognition engine 231.

For example, the object recognition engine 231 may include a neural network as shown in FIG. 9. The object recognition engine 231 may include an input layer into which image data is input, an output layer through which information about the identified object is output, and a hidden layer provided between the input layer and the output layer.

The input layer may include a plurality of input nodes i1 and i2, and image data may be input to each of the plurality of input nodes i1 and i2. For example, a luminance value and/or a color value of a plurality of pixels included in an image may be input to each of the plurality of input nodes i1 and i2.

The hidden layer may include a plurality of hidden nodes h1, and h2. A sum of output values of the plurality of input nodes i1 and i2, to which weights w1, w2, w3 and w4 are applied, may be input to each of the plurality of hidden nodes h1 and h2. For example, the processing portion 240 may input a sum of an output value of the first input node i1, to which the first weight w1 is applied, and an output value of the second input node i2, to which the second weight w2 is applied, to the first hidden node h1. Further, the processing portion 240 may input a sum of an output value of the first input node i1, to which the third weight w3 is applied, and an output value of the second input node i2, to which the fourth weight w4 is applied, to the second hidden node h2.

The processing portion 240 may apply a step function or a sigmoid function to an input value inputted to the hidden layer. For example, the processing portion 240 may input the input value of the first hidden node h1 to the sigmoid function and output an output value of the sigmoid function to the output layer. In addition, the processing portion 240 may input the input value of the second hidden node h2 to the sigmoid function, apply weights w5, w6, w7, and w8 to the output value of the sigmoid function, and output the obtained value to the output layer.

The output layer may include a plurality of output nodes o1, and o2. A sum of output values of the plurality of hidden nodes h1 and h2, to which the weights w5, w6, w7, and w8 are applied, may be input to each of the plurality of output nodes o1, and o2.

For example, the processing portion 240 may input a sum of an output value of the first hidden node h1, to which the fifth weight w5 is applied, and an output value of the second hidden node h2, to which the sixth weight w6 is applied, to the first output node o1. Further, the processing portion 240 may input a sum of an output value of the first hidden node h1, to which the seventh weight w7 is applied, and an output value of the second hidden node h2, to which the eighth weight w8 is applied, to the second output node o2.

The processing portion 240 may apply the step function or the sigmoid function to an input value inputted to the output layer. For example, the processing portion 240 may input the input value of the first output node o1 to the sigmoid function and output an output value of the sigmoid function. In addition, the processing portion 240 may input the input value of the second output node o2 to the sigmoid function, and output an output value of the sigmoid function.

An object may be assigned to each of the plurality of output nodes o1 and o2 included in the output layer, and the output values of the plurality of output nodes o1 and o2 may indicate a probability that an image is an object assigned to the plurality of output nodes o1 and o2. The processing portion 240 may identify an object included in the image based on the outputs of the plurality of output nodes o1 and o2.

According to the neural network algorithm, the output of the object recognition engine 231 may vary according to a value of weights w1 to w8 between the input, hidden, and output layers. Therefore, the processing portion 240 may set an appropriate weight w1 to w8 to accurately identify an object and set an appropriate the weight w1 to w8 of the object recognition engine 231 using the training data 232. Training the object recognition engine 231 using the training data 232 is referred to as "training"

The computing apparatus 200 may train the untrained object recognition engine 231 as shown in FIG. 10A.

The computing apparatus 200 obtains the training data 232 (1010).

The processing portion 240 may load the training data 232 stored in the storage 230. The training data 232 may include a plurality of images and a name of an object respectively corresponding to the plurality of images.

The computing apparatus 200 may obtain the training data 232 from another device connected to a wide area network (WAN).

The computing apparatus 200 inputs the training data 232 to the object recognition engine 231 (1020).

The processing portion 240 may input a luminance value and/or RGB value (red sub-pixel data, green sub-pixel data, and blue sub-pixel data) of the plurality of pixels forming the image of the training data 232 into the object recognition engine 231. For example, the processing portion 240 may input RGB values of the plurality of pixels forming the image of the training data 232 to the input nodes i1 and i2 of the input layer of the neural network.

The computing apparatus 200 compares the training data 232 with the output of the object recognition engine 231 (1030).

The processing portion 240 performs the object recognition on the image of the training data 232 using the object recognition engine 231. For example, the processing portion 240 may apply the weights w1 to w4 to the outputs of the input nodes i1 and i2 of the input layer of the neural network, and input the obtained value to the hidden nodes h1 and h2 of the hidden layer. The processing portion 240 may input the inputs of the hidden nodes h1 and h2 to the sigmoid function, apply the weights w5 to w8 to the output of the sigmoid function, and input the obtained value to the output nodes o1 and o2 of the output layer. The processing portion 240 may input the input of the output nodes o1 and o2 to the sigmoid function and output the output of the sigmoid function.

The processing portion 240 may identify an object included in the image of the training data 232 based on the output of the object recognition engine 231. For example, each of the plurality of output nodes o1 and o2 of the neural network may output a probability that an object included in the image matches an object assigned to each of the plurality of output nodes o1 and o2. The processing portion 240 may identify an object included in the image of the training data 232 based on the probability output from the neural network.

In addition, the processing portion 240 may compare the object identified by the output of the object recognition engine 231 with the object of the training data 232.

The computing apparatus 200 refines the object recognition engine 231 based on the output of the object recognition engine 231 and the training data 232 (1040).

The processing portion 240 may determine whether or not the object, which is identified by the output of the object recognition engine 231, is identical to the object of the training data 232.

In response to that the object identified by the output of the object recognition engine 231 is not identical to the object of the training data 232, the processing portion 240 refines the object recognition engine 231 in an appropriate manner. For example, in response to the probability outputted from the neural network for an object based on the training data 232 being less than a reference value, the processing portion 240 may change the weights w1 to w8 forming the neural network.

Thereafter, the computing apparatus 200 may repeatedly obtain the training data 232, input the training data 232, evaluate the output of the object recognition engine 231, and refine the object recognition engine 231. By the training operation, the object recognition engine 231 may be trained to identify an object included in the image of the training data 232. For example, the weights w1 to w8 of the neural network are set to identify an object included in the image of the training data 232 through the training operation.

In addition, the computing apparatus 200 may identify an object in an image using the trained object recognition engine 231 as shown in FIG. 10B.

The computing apparatus 200 receives an image (1060).

The processing portion 240 may receive an image including an object to be identified from an external device through the communicator 220. For example, the processing portion 240 may receive an inside image of the storage compartment 110 from the refrigerator 100 through the communicator 220.

The computing apparatus 200 inputs the received image to the object recognition engine 231 (1070).

The processing portion 240 may input luminance values and/or RGB values (red sub-pixel data, green sub-pixel data, and blue sub-pixel data) of the plurality of pixels forming an image to the object recognition engine 231. The operation 1070 may be the same as the operation 1020.

The computing apparatus 200 performs object recognition (1080).

The processing portion 240 may perform the object recognition on the received image using the object recognition engine 231, and identify an object included in the image of the training data 232 based on the output of the object recognition engine 231. The operation 1080 may be the same as the operation 1030.

The computing apparatus 200 outputs a result of the object recognition (1090).

The processing portion 240 may allow the communicator 220 to transmit information about the object of the received image to another device. For example, the processing portion 240 may transmit information related to food identified from the inside image of the storage compartment 110 to the refrigerator 100 through the communicator 220.

In order to identify food stored in the storage compartment 110 of the refrigerator 100, the computing apparatus 200 may identify food by using a proper method.

Figure 11:
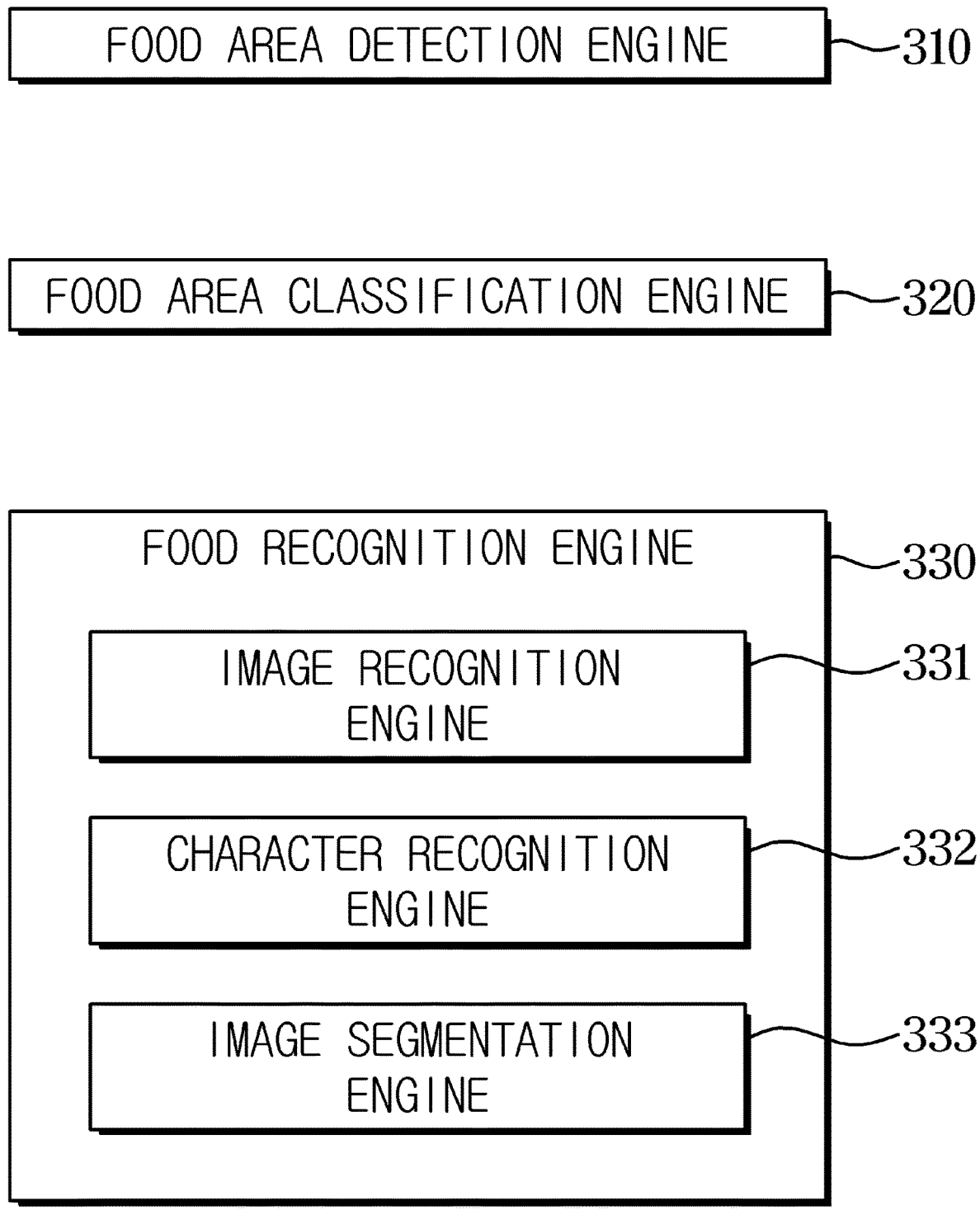
FIG. 11 illustrates a configuration of the object recognition engine of the computing apparatus according to one embodiment of the present disclosure.
Figure 12A:
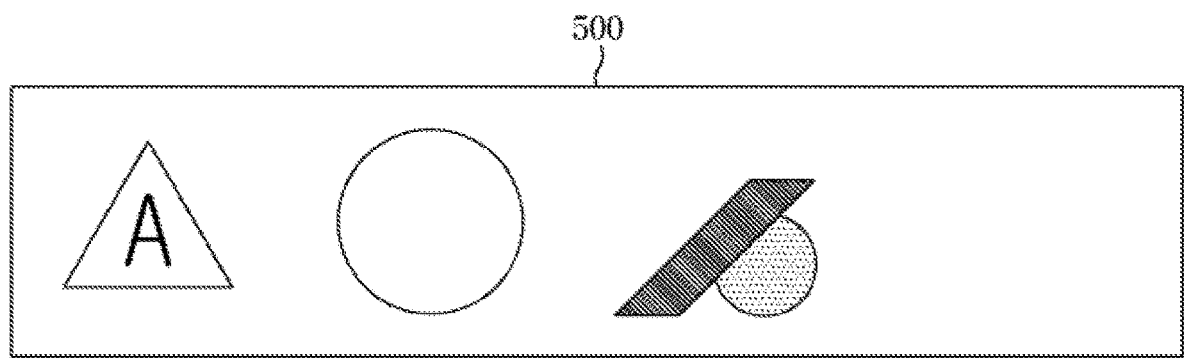
FIGS. 12A, 12B and 12C illustrate an example in which the object recognition engine, which is included in the computing apparatus according to one embodiment of the present disclosure, identifies food.
Figure 12B:
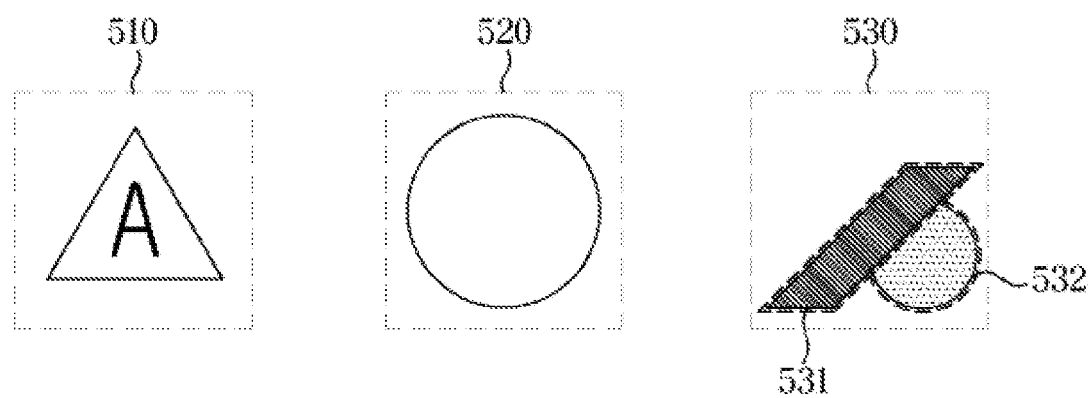
Figure 12C:
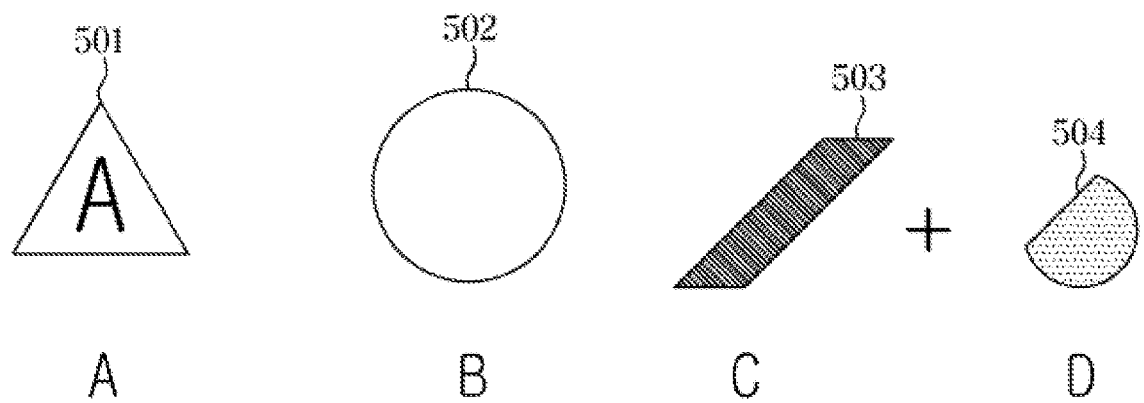
Figure 14:
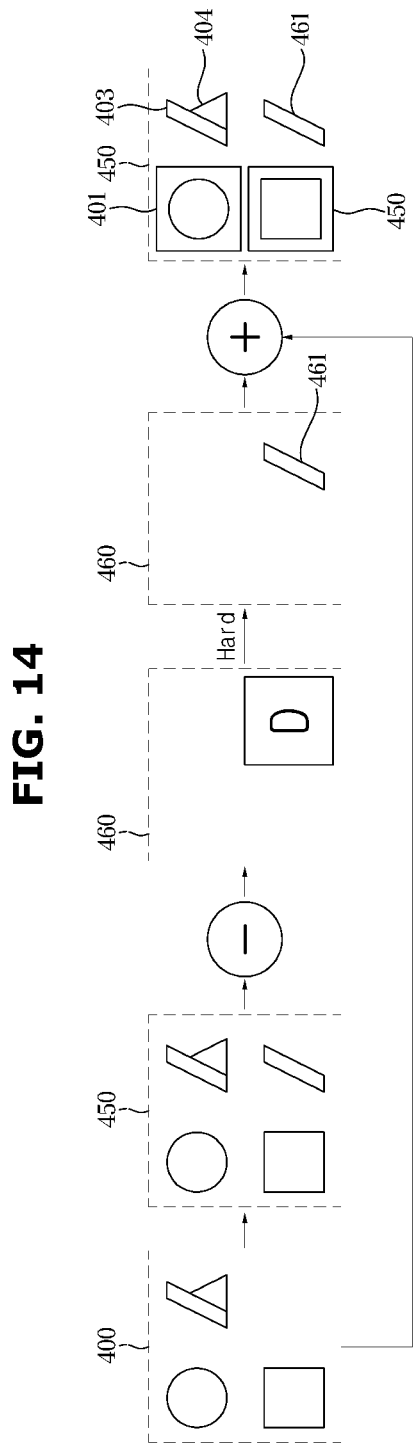
FIG. 14 illustrates another example in which the object recognition engine, which is included in the computing apparatus according to one embodiment of the present disclosure, identifies food.

FIG. 11 illustrates a configuration of the object recognition engine of the computing apparatus according to one embodiment of the present disclosure. FIGS. 12A, 12B and 12C illustrate an example in which the object recognition engine, which is included in the computing apparatus according to one embodiment of the present disclosure, identifies food. FIG. 13 illustrates another example in which the object recognition engine, which is included in the computing apparatus according to one embodiment of the present disclosure, identifies food. FIG. 14 illustrates another example in which the object recognition engine, which is included in the computing apparatus according to one embodiment of the present disclosure, identifies food.

As shown in FIG. 11, for the food recognition, the computing apparatus 200 may include a food area detection engine 310, a food area classification engine 320, and a food recognition engine 330. The food area detection engine 310, the food area classification engine 320, and the food recognition engine 330 may be implemented as hardware or software, respectively. For example, the food area detection engine 310, the food area classification engine 320 and the food recognition engine 330 may be a portion of the processor 241 as hardware, or may be a portion of the program stored in the storage 230 as software.

The food area detection engine 310 may obtain an inside image of storage compartment 500 that is obtained by imaging the inside of the storage compartment 110 of the refrigerator 100, and detect the food areas 510, 520, and 530, in which foods 501, 502, 503, and 504 are located, on the inside image of the storage compartment 500.

The food area detection engine 310 may detect the food areas 510, 520, and 530 in which food is located in various directions.

For example, the food area detection engine 310 may separate the food areas 510, 520, and 530 from a background area based on a difference between the inside image of the storage compartment, in which the food is located, with an inside image of the empty storage compartment 110. The food area detection engine 310 may receive the inside image of the storage compartment and a reference image (the inside image of the empty storage compartment), and the food area detection engine 310 may separate the food areas 510, 520, and 530, in which the food is located, from the background area of the storage compartment 110 based on a difference between the inside image of the storage compartment and the reference image.

As another example, the food area detection engine 310 may extract an edge from the inside image of the storage compartment (edge detection), and separate the food areas 510, 520, and 530, in which the food is located, from the background area based on the edge of the image.

As another example, the food area detection engine 310 may extract information about a color change from the inside image of the storage compartment, and separate the food areas 510, 520, and 530, in which food is located, from the background area based on a boundary line in which color thereof rapidly changes in the inside image of the storage compartment.

In addition, the food area detection engine 310 may delete an image of the shelf 110c and/or a reflection image of the food from the food areas 510, 520, and 530 in order to improve a rate of identifying food.

For example, the food area detection engine 310 may obtain the inside image 500 of the storage compartment, as illustrated in FIG. 12A, and detect each of the food areas 510, 520, and 530, in which each of the foods 501, 502, 503, and 504 is located, from the inside image 500 of the storage compartment, as illustrated in FIG. 12B. The food area detection engine 310 may detect the first food area 510 in which the first food A 501 is located, the second food area 520 in which the second food B 502 is located, and the third food area 530 in which the third food C 503 and the fourth food C 504 are located.

The food area classification engine 320 may classify the food areas 510, 520, and 530 detected by the food area detection engine 310. For example, the food area classification engine 320 may classify the food areas 510, 520, and 530 according to a difficulty (difficulty level) for identifying food in each of the food areas 510, 520, and 530.

The food area classification engine 320 may classify the food areas into a character recognition area in which a character is detected in the food areas 510, 520, and 530, an image recognition area in which a single food item is detected in the food areas 510, 520, and 530, and an image segmentation area in which a plurality of food times is detected in the food areas 510, 520, and 530.

In response to detecting a character in the food areas 510, 520, and 530 using a character detection algorithm, the food area classification engine 320 may classify the corresponding area as the character recognition area. For example, processed foods such as canned food and ham do not have a unique shape to identify the food, but characters to identify the food are provided on the exterior of the food. Food in the character recognition area may be identified by the character recognition.

In response to that the character is not detected using the character detection algorithm, the food area classification engine 320 may determine whether a single food item is located or a plurality of food items is superposed on each other in the food areas 510, 520 and 530, using the edge detection and/or the color change detection.

Particularly, in response to detecting a boundary line in which the color rapidly changes in the food areas 510, 520, and 530, the food area classification engine 320 may classify the corresponding area as the image segmentation area in which the plurality of food items is located with being superposed on each other in the food areas 510, 520, and 530. In response to not detecting a boundary line in which the color rapidly changes in the food areas 510, 520, and 530, the food area classification engine 320 may classify the corresponding area as the image recognition area in which a single food item is located in the food areas 510, 520, and 530.

For example, the food area classification engine 320 may detect a character "A" in the first food area 510 shown in FIG. 12B by using the character detection algorithm. Accordingly, the food area classification engine 320 may classify the first food area 510 as the character recognition area.

In addition, the food area classification engine 320 may not detect characters in the second food area 520 and may not detect the boundary line in which the color rapidly changes in the second food area 520, as illustrated in FIG. 12B. Accordingly, the food area classification engine 320 may classify the second food area 520 as the image recognition area.

In addition, the food area classification engine 320 may detect the boundary line in which the color rapidly changes in the third food area 530, as illustrated in FIG. 12B. Accordingly, the food area classification engine 320 may classify the third food area 530 as the image segmentation area.

The food recognition engine 330 may apply different food recognition methods (or food recognition engines) to the food areas 510, 520, and 530 classified by the food area classification engine 320, thereby identifying the food of the food areas 510, 520 and 530. Particularly, the food recognition engine 330 may identify the food of the food areas 510, 520 and 530 by applying at least one of the character recognition engine 331, the image recognition engine 332, and the image segmentation engine 333 to the food areas 510, 520 and 530.

For example, the food recognition engine 330 may recognize a character "A" from the first food area 510 using the character recognition engine 331 as shown in FIG. 12C, and the food recognition engine 330 may identify the food A 501 of the first food area 510 based on the character "A".

In addition, the food recognition engine 330 may identify the food B 502 in the second food area 520 using the image recognition engine 332 as shown in FIG. 12C. Particularly, the image recognition engine 332 may identify the food B 502 based on the image of the second food area 520, itself.

In addition, by using the image segmentation engine 333, the food recognition engine 330 may segment the images of the food that is superposed on each other. For example, the image segmentation engine 333 may convert the image segmentation area into a color space in which the plurality of food items is distinguished, and then divide the color space into a plurality of segmented food areas based on an appropriate threshold value. Further, the image segmentation engine 333 may group areas having a color similar to each other in the image segmentation area and divide the grouped area into a plurality of segmented food areas.

As a result of the image segmentation, the third food area 530 shown FIG. 12B may be divided into a first segmented food area 531 and a second segmented food area 532, as shown in FIG. 12C. In addition, the food recognition engine 330 may perform the food recognition on each of the first segmented food area 531 and the second segmented food area 532 using the image recognition engine 333. The food recognition engine 330 may identify the food C 503 in the first segmented food area 531 and the food D 504 in the second segmented food area 532.

As mentioned above, the food area detection engine 310 may detect the food areas 510, 520, and 530 in which the food is located by comparing the image of the empty storage compartment 110 with the received image. The food area classification engine 320 may classify the food areas 510, 520, and 530 based on whether the food areas 510, 520, and 530 include a character and/or whether the food areas 510, 520, and 530 include a color boundary.

The food recognition engine 330 may apply the different recognition algorithms to the food areas 510, 520, and 530, which are classified as different groups, thereby identifying the food. For example, the food recognition engine 330 may apply the character recognition engine 331 to the food area including a character, so as to identify the food. The food recognition engine 330 may apply the image segmentation engine 333 to the food area including the color boundary so as to segment the food area. Further, the food recognition engine 330 may identify the food in the image using the image recognition engine 332.

In addition, as shown in FIG. 13, the computing apparatus 200 may output an inside image 400 of storage compartment including information on foods 410, 402, 403, and 404 from the inside image 400 of storage compartment.

The food area detection engine 310 may obtain the inside image 400 of the storage compartment, and detect a first food area 410 in which a first food 401 is located, a second food area 420 in which a second food 402 is located, and a third food area 430 in which a third food 403 and a fourth food 404 are located.

The food area classification engine 320 may classify the first food area 410, from which a character is extracted, as the character recognition area, and classify the second food area 420, from which a character is not extracted, as the image recognition area, and classify the third food area 430 including an image including a boundary line that rapidly changes, as the image segmentation area.

The character recognition engine 331 of the food recognition engine 330 may identify the first food 401 in the first food area 410 using the character recognition, and the image recognition engine 332 of the food recognition engine 330 may identify the second food 402 of the second food area 420 using the image recognition. The image segmentation engine 333 of the food recognition engine 330 may segment the third food area 430 into the image of the third food 403 and the image of the fourth food 404, and the character recognition engine 331 and/or the image recognition engine 332 may identify the third food 403 and the fourth food 404 in the image of the third food 403 and the image of the fourth food 404, respectively.

The food recognition engine 330 may assign the first food 401 in the first food area 410, assign the second food 402 in the second food area 420, and may assign the third food 403 and the fourth food 404 in the third food area 430. In addition, the food recognition engine 330 may output the inside image 400 of storage compartment including the first food area 410 in which the first food 401 is assigned, the second food area 420 in which the second food 402 is assigned, and the third food area 430 in which the third food 403 and the fourth food 404 are assigned.

In addition, as shown in FIG. 14, the computing apparatus 200 may identify a food 461 added to a new inside image 450 of storage compartment using the inside image 400 of storage compartment in which the foods 401, 402, 403, and 404 are identified in advance.

The food area detection engine 310 may obtain the new inside image 450 of storage compartment, and detect a fourth food area 460, in which a fifth food 461 is located, based on a difference between the existing inside image 400 of storage compartment and the new inside image 450 of storage compartment.

The food area classification engine 320 may classify the fourth food area 460 as any one of the character recognition area, the image recognition area, and the image segmentation area.

The food recognition engine 330 may identify the fifth food 461 of the fourth food area 460 according to the classification of the fourth food area 460 (whether it is the character recognition area, the image recognition area, or the image segmentation area).

The food recognition engine 330 may assign the fifth food 461 in the fourth food area 460. In addition, the food recognition engine 330 may output the new inside image of storage compartment 450 in which the fifth food 461 is assigned, by combining the fourth food area 460, in which the fifth food 461 is assigned, to the existing inside image of storage compartment 400.

Hereinafter an operation of the food management system 1 including the refrigerator 100, the computing apparatus 200, and the user equipment 300 will be described.

Figure 15:
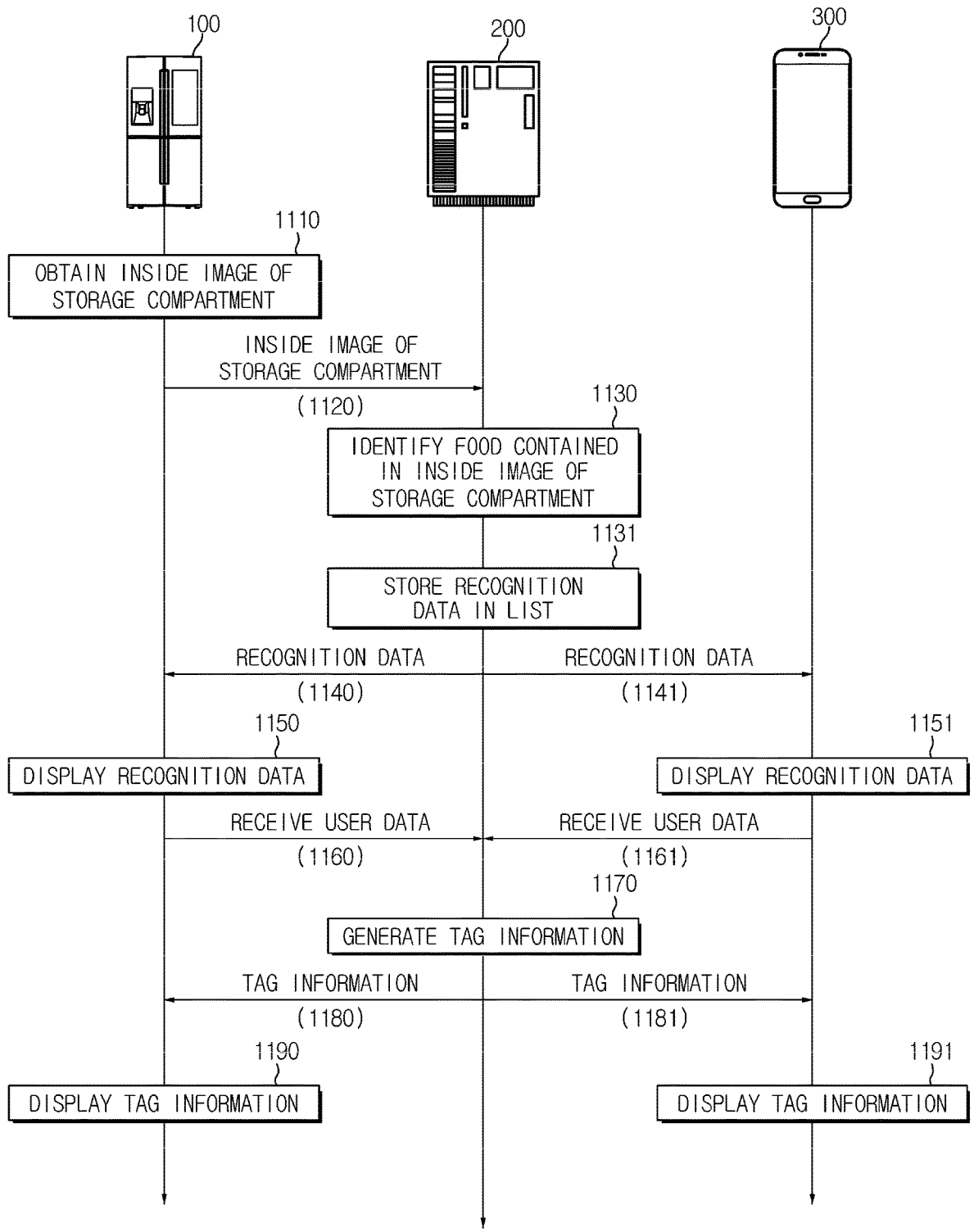
FIG. 15 illustrates an example of a food recognition method and tag generation of the food management system.
Figure 16:
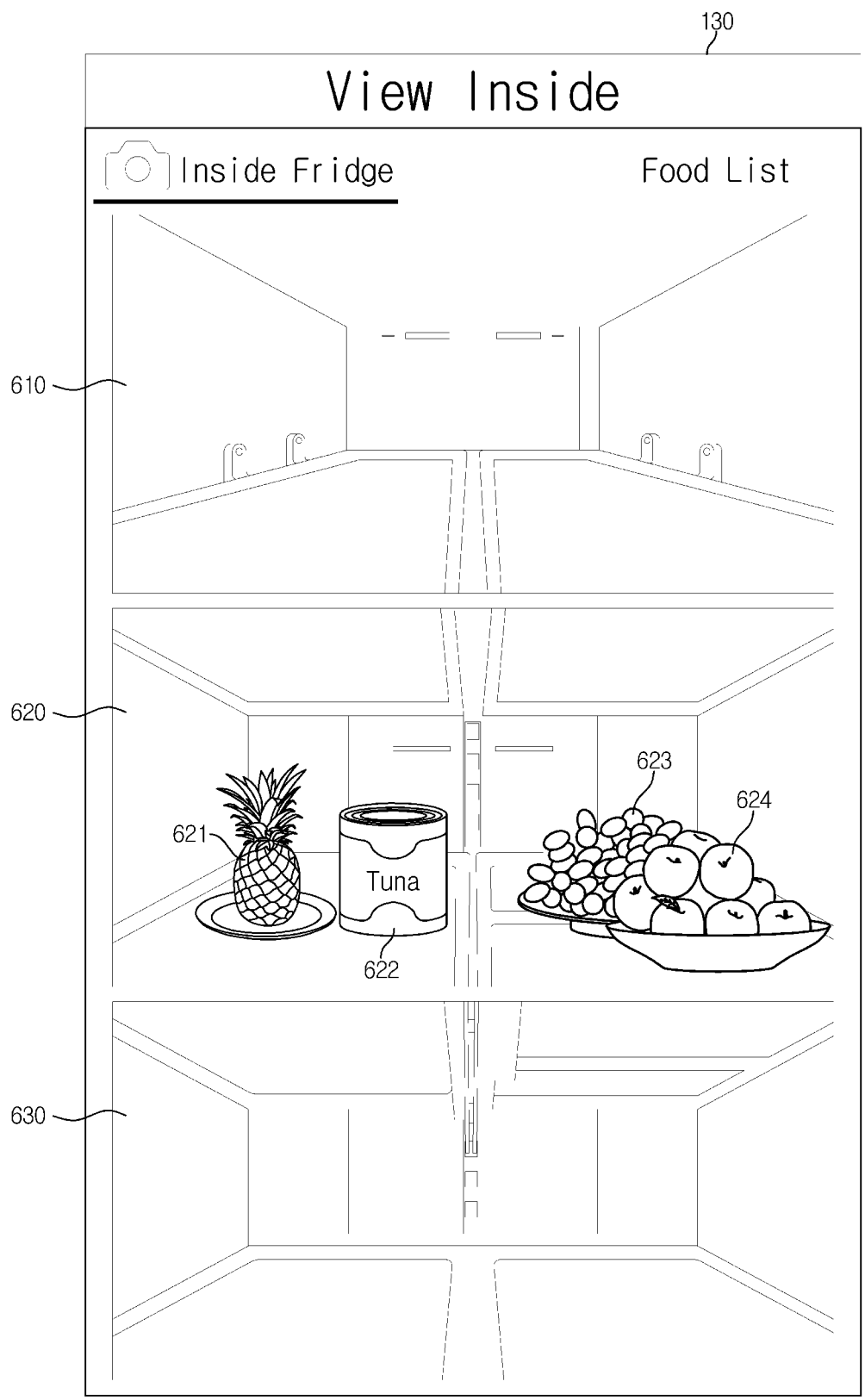
FIG. 16 illustrates an inside image of storage compartment imaged by the food recognition method shown in FIG. 15.
Figure 17A:
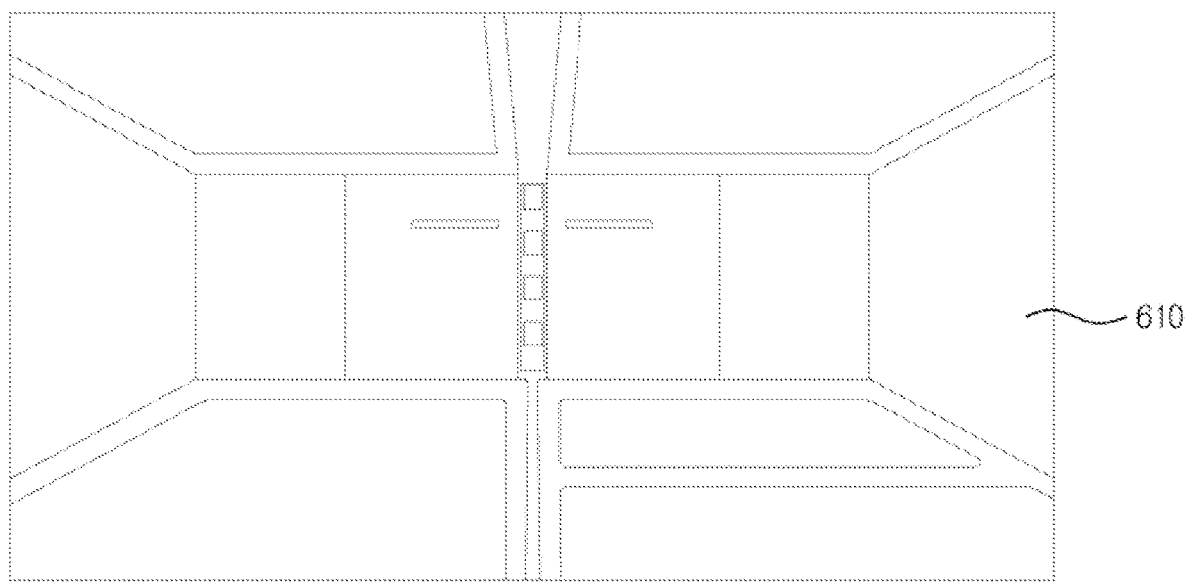
FIGS. 17A and 17B illustrate an example of identifying a food area by the food recognition method shown in FIG. 15.
Figure 17B:
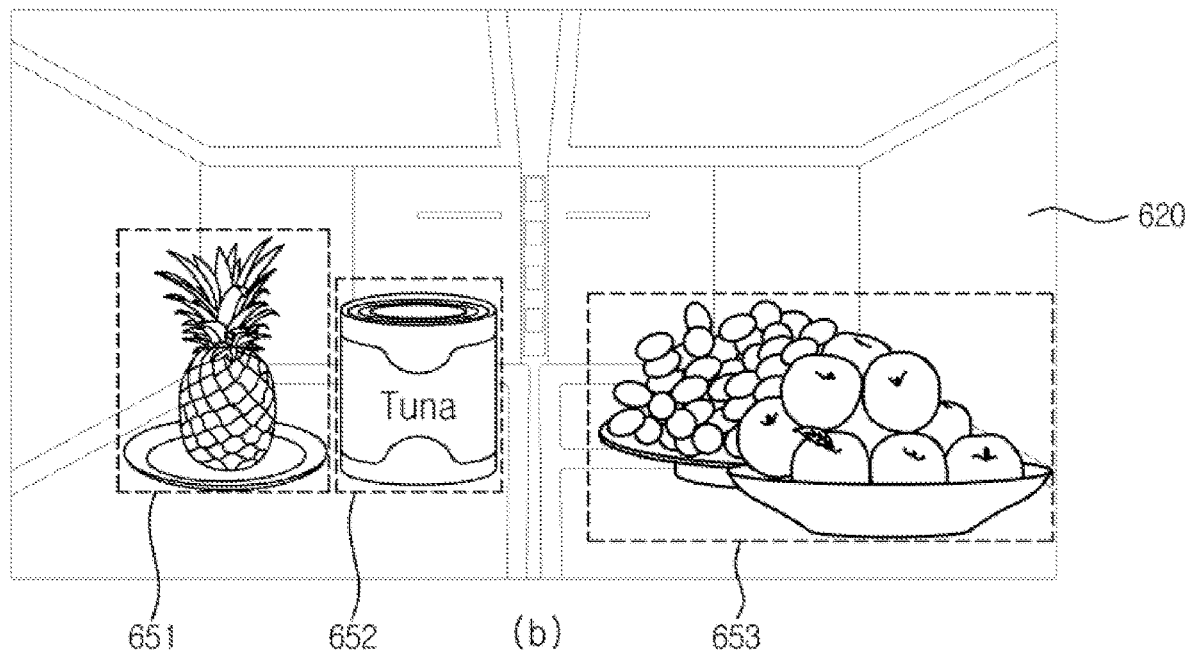
Figure 18:
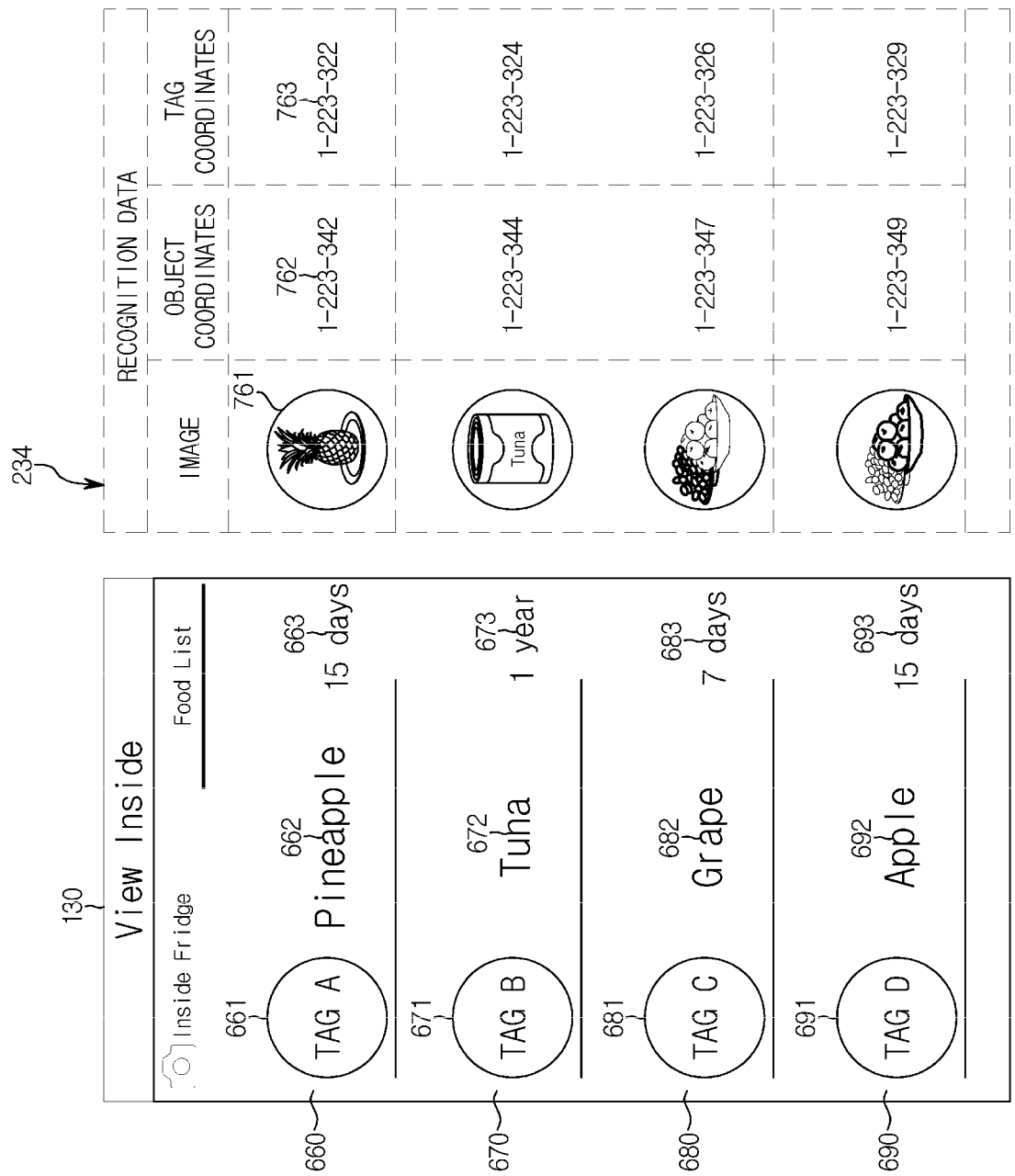
FIG. 18 illustrates an example of displaying a pop-up associated with the tag generation by the food recognition method shown in FIG. 15.
Figure 19:
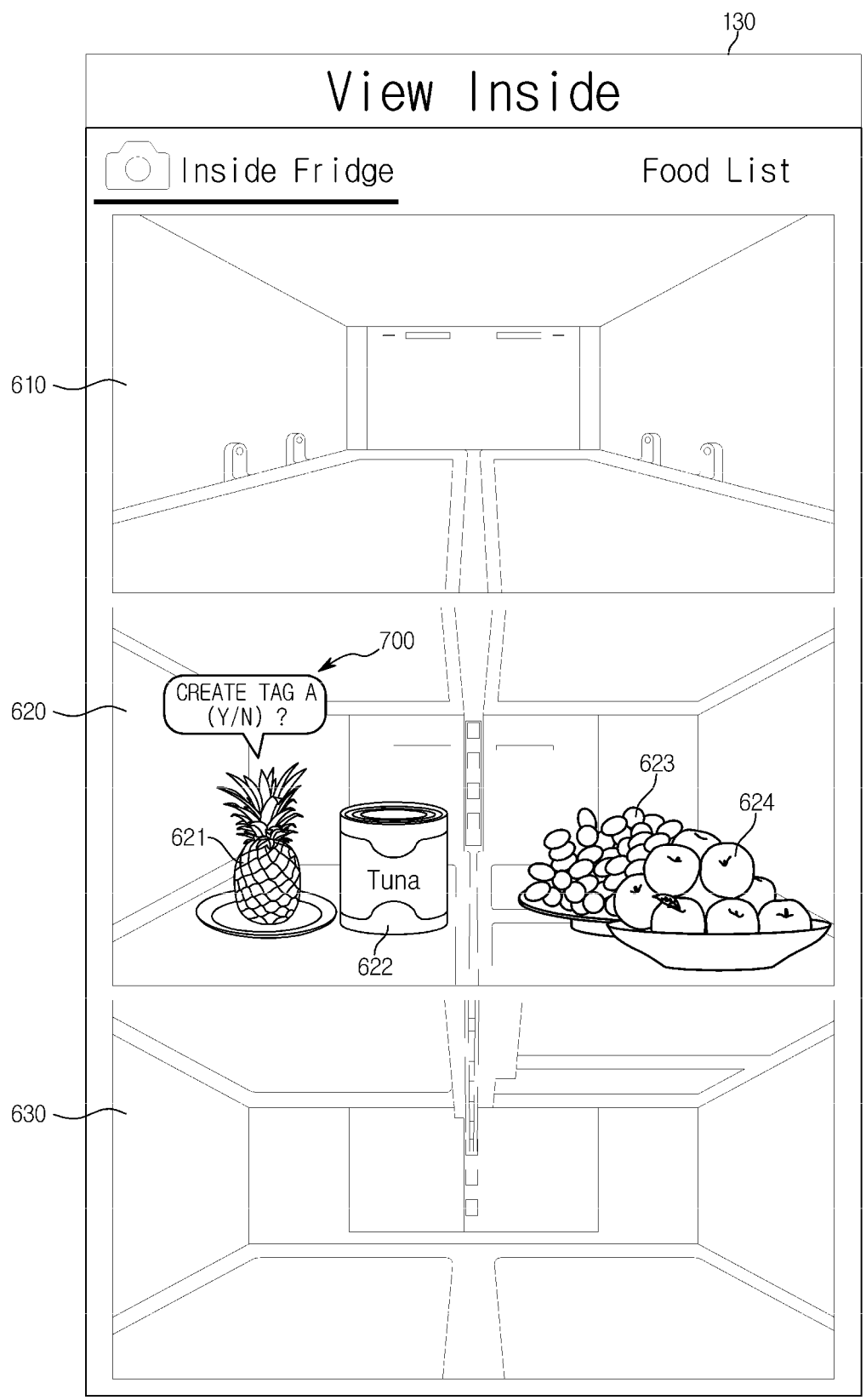
FIG. 19 illustrates an example for illustrating a specific method for the tag generation shown in FIG. 15.
Figure 20:
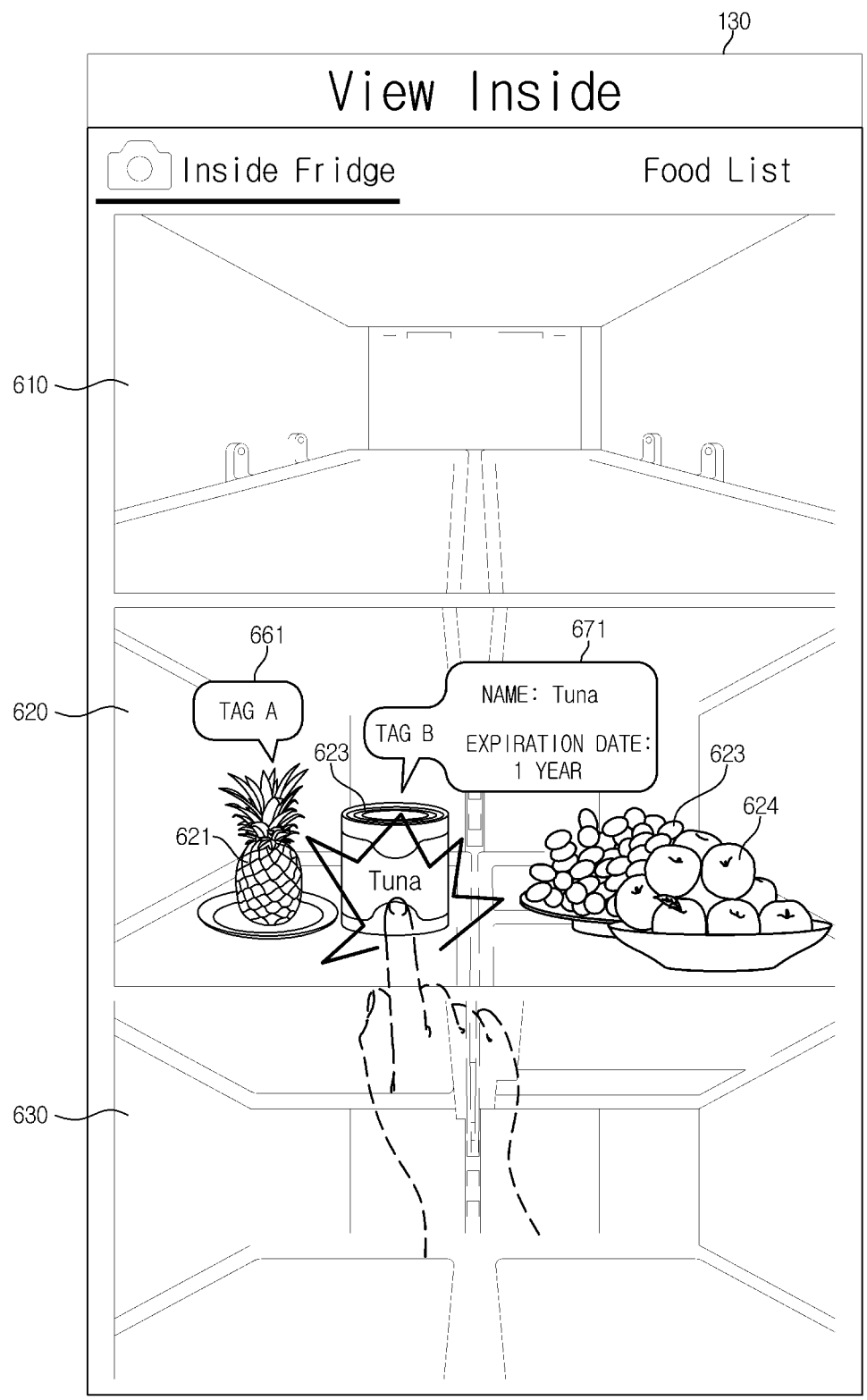
FIG. 20 illustrates an example of an interface, which is related to the tag generation, displayed by the refrigerator.

FIG. 15 illustrates an example of a food recognition method and tag generation of the food management system. FIG. 16 illustrates an inside image of storage compartment imaged by the food recognition method shown in FIG. 15. FIGS. 17A and 17B illustrate an example of identifying a food area by the food recognition method shown in FIG. 15. FIG. 18 illustrates an example of displaying a pop-up associated with the tag generation by the food recognition method shown in FIG. 15. FIG. 19 illustrates an example for illustrating a specific method for the tag generation shown in FIG. 15. FIG. 20 illustrates an example of an interface, which is related to the tag generation, displayed by the refrigerator.

The food recognition and the tag generation of the food management system 1 will be described with reference to FIGS. 15, 16, 17, 18, 19, and 20.

The refrigerator 100 obtains the inside image of the storage compartment 110 (1110).

The refrigerator 100 may image the inside of the storage compartment 110 through the camera 150 and obtain the inside image of the storage compartment 110.

The controller 190 may control the camera 150 to image the inside of the storage compartment 110 in response to detecting the closing of the opened door 120. The camera 150 may image the plurality of spaces partitioned by the shelf 110c. For example, the first imager 151 of the camera 150 may image the first storage space 111a, the second imager 151 may image the second storage space 111b, and the third imager 151 may image the third storage space 111c of the upper storage compartment 111. The controller 190 may obtain the inside image of the storage compartment 110 from the camera 150.

As another example, the controller 190 may control the camera 150 to image the inside image of the storage compartment 110 in response to a user input through the touch screen display 130, and the controller 190 may obtain the inside image of the storage compartment 110 from the camera 150.

As another example, the controller 190 may control the camera 150 to image the inside image of the storage compartment 110 in response to a user input received from the user equipment 300 through the refrigerator communicator 170, and the controller 190 may obtain the inside image of the storage compartment 110 from the camera 150.

As shown in FIG. 16, the controller 190 may display the inside image of the storage compartment 110, which is imaged by the camera 150, on the touch screen display 130. For example, on the touch screen display 130, the controller 190 may display an inside image 610 of the first storage space 111a, an inside image 620 of the second storage space 111b, and an inside image 630 of the third storage space 111c.

The refrigerator 100 may transmit the inside image of the storage compartment 110 to the computing apparatus 200, and the computing apparatus 200 may receive the inside image of the storage compartment 110 from the refrigerator 100 (1120).

The refrigerator 100 may transmit the inside image of the storage compartment 110 to the computing apparatus 200 through the communication network NET. The controller 190 may control the refrigerator communicator 170 to transmit the inside image of the storage compartment 110 to the computing apparatus 200.

The computing apparatus 200 may receive the inside image of the storage compartment 110 from the refrigerator 100 through the communication network NET. The processing portion 240 may obtain the inside image of the storage compartment 110 through the communicator 220.

The computing apparatus 200 identifies food included in the inside image of the storage compartment 110 (1130).

The computing apparatus 200 may identify food included in the inside image of the storage compartment 110 by using the trained object recognition engine 231.

The processing portion 240 may detect food areas 651, 652, and 653, in which food is located, in an inside image 650 of storage compartment. For example, as shown in FIGS. 17A and 17B, the processing portion 240 may separate the food areas 651, 652, and 653 from a background area based on a difference between an inside image 640 of empty storage compartment 110 and the inside image 650 of storage compartment 110 in which the food is located. The processing portion 240 may detect a first food area 651 in which a pineapple 621 is located, a second food area 652 in which a canned food product 622 is located, and a third food area in which a grape 623 and an apple 624 are superposed.

The processing portion 240 may classify the food areas 651, 652, and 653. For example, the processing portion 240 may classify the food areas 651, 652, and 653 into the character recognition area in which a character is detected in the food area, the image recognition area in which a single food item is detected in the food area, and the image segmentation area in which a plurality of food items is detected.

The processing portion 240 may classify the first food area 651, in which the pineapple 621 is located, as the image recognition area, the second food area 652, in which the canned food product 622 is located, as the character recognition area and the third food area 653, in which the grape 623 and the apple 624 are superposed on each other, as the image segmentation area.

The processing portion 240 may identify the pineapple 621 in the first food area 651 using the image recognition algorithm, and apply the character recognition algorithm to the second food area 652 so as to identify the canned food product 622 as a tuna. Further, the processing portion 240 may segment an image of grape and an image of apple from the third food area 653, and apply the image recognition algorithm to the image of grape and the image of apple, thereby identifying the grape 623 and the apple 624.

For example, the processing portion 240 may include an object recognition engine 231 using a neural network. The processing portion 240 may input a luminance value and/or a color value of a plurality of pixels included in an image to each of the plurality of input nodes i1 and i2 of the neural network. The processing portion 240 may apply the weights w1 to w4 to the values of the plurality of input nodes i1 and i2 and then output the obtained value to a plurality of hidden nodes h1 and h2. The processing portion 240 may input a value, which is inputted to the plurality of hidden nodes h1 and h2, to a sigmoid function, and apply the weights w5 to w8 to the output value of the sigmoid function and output the obtained value to a plurality of output nodes o1 and o2. The processing portion 240 may input a value, which is inputted to the plurality of output nodes o1 and o2, to the sigmoid function, and then an output value of the sigmoid function may be an output of the neural network. At this time, food may be assigned to each of the plurality of output nodes o1 and o2, and the output value of the plurality of output nodes o1 and o2 may indicate a probability that an image is an object assigned to the plurality of output nodes o1 and o2. The processing portion 240 may identify an object included in the image based on the outputs of the plurality of output nodes o1 and o2.

The processing portion 240 stores the recognition data in the list 234 (1131).

The information (recognition data) about the food identified by the processing portion 240 includes the type of food and location coordinates (object coordinates) of the food. Referring to FIG. 18, recognition data for the pineapple 621 may be a type of food "pineapple" and a location coordinate 762 for the first food area 651.

The processing portion 240 generates recognition data for all foods identified from an image, which is obtained by imaging the inside of the storage compartment 110, and stores the recognition data in the list 234 along with the imaged time.

Meanwhile, in relation to the type of the identified food, the processing portion 240 may match the image 671 of the identified food included in the food database 232a with the food. According to the embodiment, the processing portion 240 may process the type of food to be included in the recognition data as a pineapple image (pineapple_1.jpg, 671) instead of the name 'pineapple'. In this case, an image may be stored in the list 234 instead of the name of the food.

The processing portion 240 transmits the recognition data to the refrigerator 100 or the user equipment 300 through the communicator 220 (1140 and 1141).

The refrigerator or the user equipment 300 converts the received recognition data and displays the converted data (1150 and 1151).

Referring again to FIG. 18, the refrigerator 100 may display "View Inside" on the touch screen display 130. "View inside" includes "Inside Fridge" that displays an image that is obtained by imaging the inside of the storage compartment 110, and "food list" that displays food-related information generated based on the recognition data.

Particularly, "food list" may include the name of the identified product, such as "pineapple" 662 and expiration date 663, and a tag A 661 matching the pineapple 621.

The name 662 and the expiration date 663 may be generated or changed based on the recognition data or the user input command. In addition, as for the tag A 661, as shown in FIG. 19, the refrigerator 100 displays a pop-up 700 regarding the generation of the tag A 661 on the touch screen display 130 and receive a user input, thereby generating the tag A 661.

The refrigerator 100 or the user equipment 300 receives user data included in the user input (1160, and 1161).

As described above, the user data may include the name 662, the expiration date 663 listed in "food list", and an input command regarding whether to generate the tag.

The refrigerator 100 or the user equipment 300 transmits the user data to the computing apparatus 200, and the computing apparatus 200 generates tag information (1170).

The tag information is data generated by matching the received user data with the recognition data included in the list 234, and the tag information includes an image of a tag to be generated, tag coordinates, and recognition data to be included in the tag.

In response to that the name of the identified food is different from the information inputted by the user, the processing portion 240 may change the name of the food to the name of the food included in the user data. The processing portion 240 may refine the object recognition engine based on the user data.

The processing portion 240 stores the expiration date 663 included in the user data, and the tag coordinates 673 of the generated tag A 661 in the list 234. That is, the processing portion 240 matches the tag coordinates with the recognition data of the identified food in response to the input command. For example, in response to that the user data includes the generation of the tag A for a pineapple, the processing portion 240 checks the pineapple and object coordinates of the recognition data included in the list 234 to determine whether or not the recognition data matches the object coordinates, and generates tag A coordinates 763, and stores the coordinates 763 in the list 234.

After the matching is completed, the computing apparatus 200 transmits the generated tag information to the refrigerator 200 or the user equipment 300 (1180 and 1181).

The refrigerator 200 or the user equipment 300 displays the generated tag information (1190 and 1191).

For example, the refrigerator 200 may display a graphic user interface as shown in FIG. 20 on the touch screen display 130.

On "Inside Fridge", together with the inside image of the storage compartment 110, the tag A 661 may be displayed on an upper side of the image of the pineapple 621 and a tag B 671 may be displayed on an upper side of the image of the canned food product 622.

For example, in response to that a user touches the food area 652, in which the image of the canned food product is displayed on the touch screen display 130, the refrigerator 100 may change a graphic user interface of the tag B 671 to display tag information matching the canned food product 672 and display the changed graphic user interface, as illustrated in FIG. 20. The tag information may include "Tuna", which is a food name of the canned food product, and "one year", which is an expiration date, and the refrigerator may display tag information by changing the tag B 671.

Meanwhile, the embodiments shown in FIGS. 18 to 20 are only examples, and thus tags and tag information may be generated and displayed through various methods.

Figure 21:
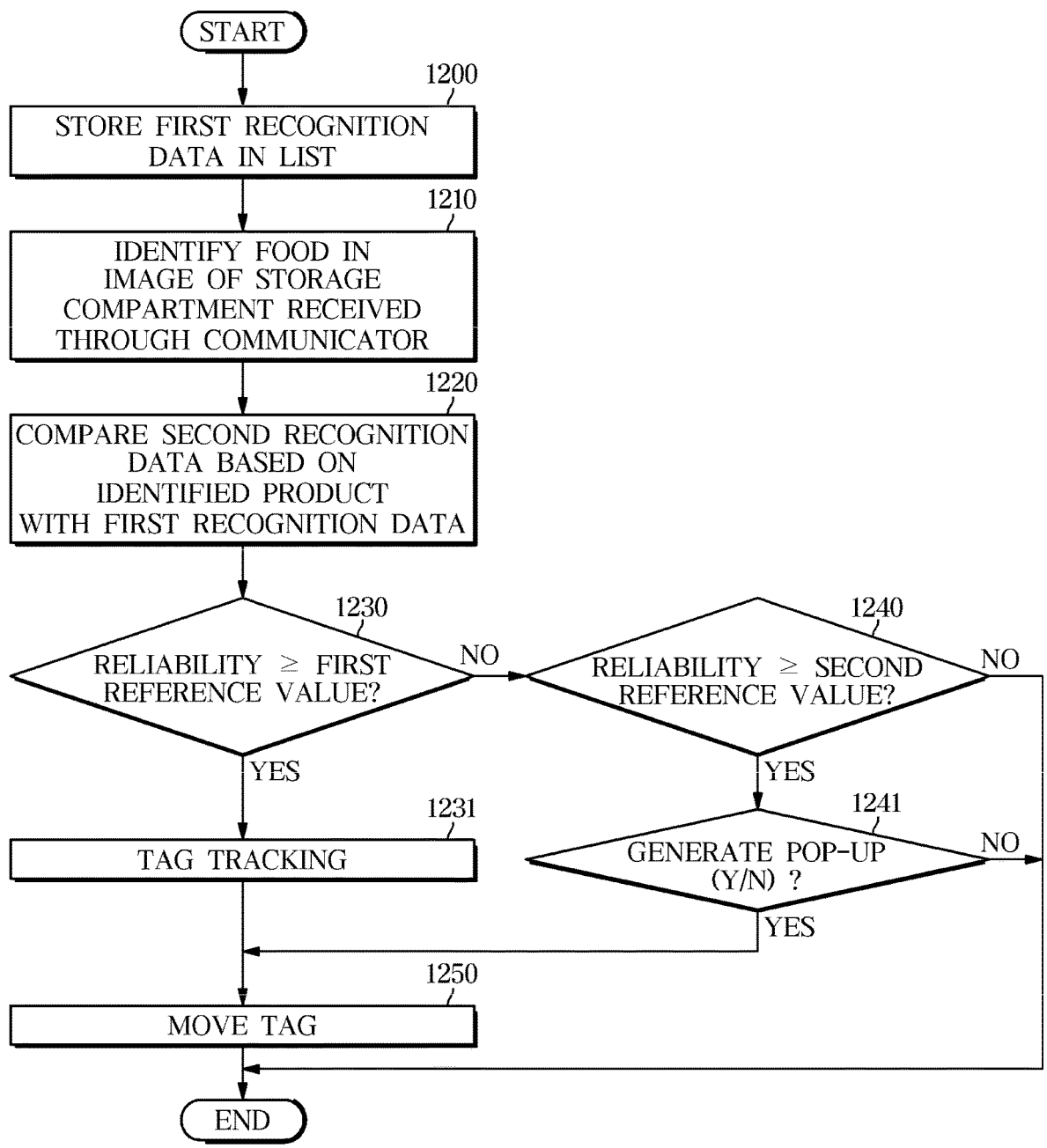
FIG. 21 is a flowchart illustrating a method for tracking a tag according to one embodiment of the present disclosure.

FIG. 21 is a flowchart illustrating a method for tracking a tag according to one embodiment of the present disclosure. FIGS. 22A, 22B, 22C and 23 illustrate a specific example of tracking according to the embodiment of FIG. 21. FIG. 24 illustrates another state occurring according to one embodiment.

Referring to FIG. 21, the processing portion 240 stores first recognition data in the list 234 (1200).

The first recognition data identifies food based on an image that is obtained by imaging the inside of the storage compartment 110 at a first point of time and includes the type of the identified food and location coordinates.

The processing portion 240 identifies the food in the image of the storage compartment received by the communicator 220 (1210).

Particularly, the refrigerator 100 may control the camera 150 to image the inside of the storage compartment 110 in response to detecting that the opened door 120 is closed. The communicator 220 receives an image of the storage compartment 110, which is imaged due to the closing of the door 120, from the refrigerator 100.

By using the trained object recognition engine 231, the processing portion 240 identifies food included in the inside image of the storage compartment 110 based on the image received by the communicator 220. That is, the recognition data about the identified food (hereinafter, referred to as second recognition data) is generated based on the inside image of the storage compartment 110 imaged at a point of time that is later than the inside image of the storage compartment 110 at the first point of time in which the first recognition data is generated.

Figure 22A:
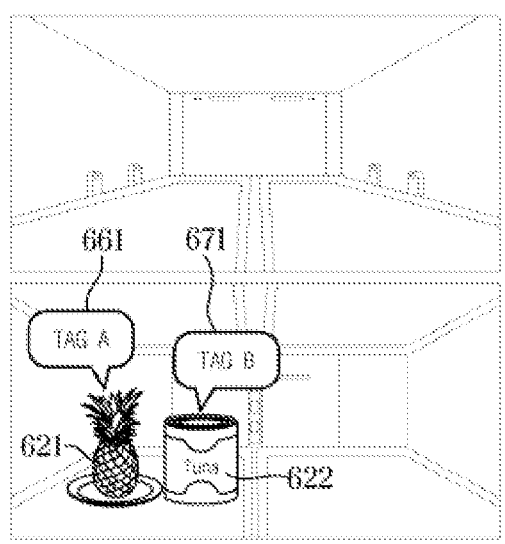
FIGS. 22A, 22B, 22C and 23 illustrate a specific example of tracking according to the embodiment of FIG. 21.
Figure 22B:
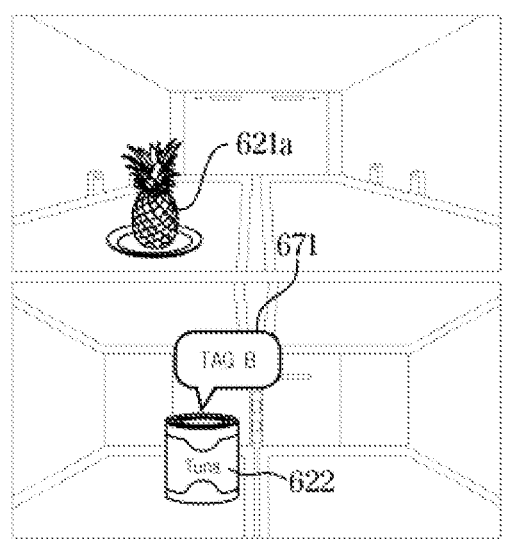
Figure 22C:
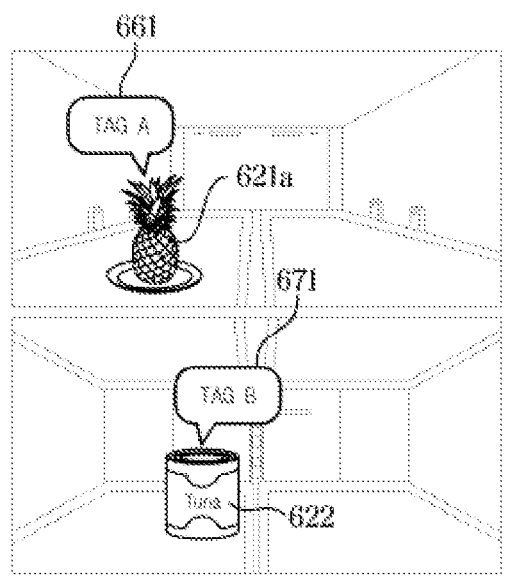

Referring to FIGS. 22A, 22B, 22C, the pineapple 621 and the canned food product 622 may be included in the image of the storage compartment 110 imaged at the first point of time. The processing portion 240 generates tag information including the tag A 661 and the tag B 671 for the pineapple and the canned food product, which is identified in the image imaged at the first point of time, and transmits the tag information to the refrigerator 100. The refrigerator 100 may display the inside image including tag information on the touch screen display 130 as shown in FIG. 22A.

At the second point of time at which the open door 120 is closed, the processing portion 240 may receive an inside image of the storage compartment in which a pineapple 621a is moved, as shown in FIG. 22B. By using the object recognition engine 231, the processing portion 240 identifies the pineapple 621a and the canned food product 622 based on the inside image of the storage compartment.

Figure 23:
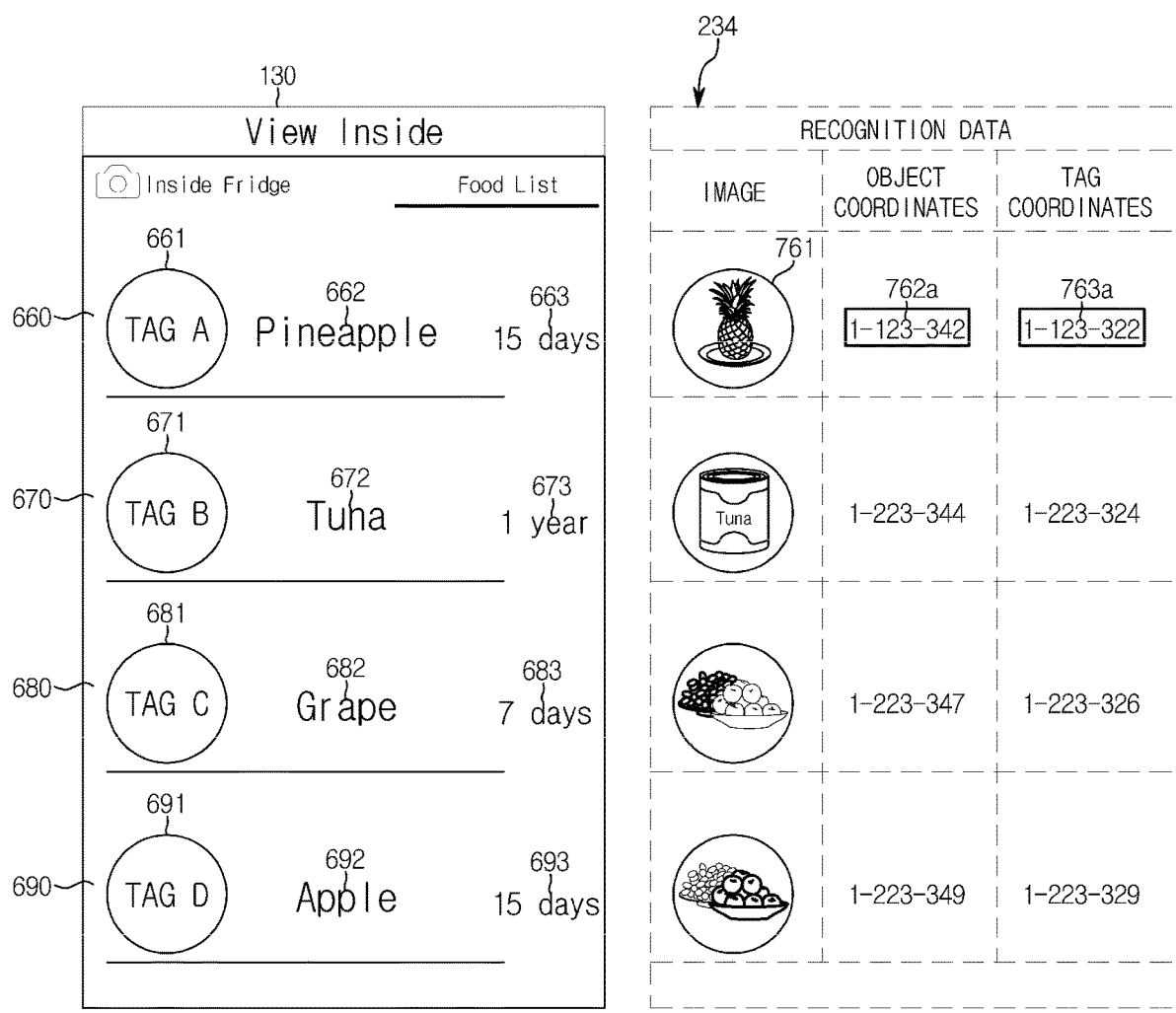

The recognition data, which is generated based on the image imaged at the second point of time, may be stored in the list 234 as shown in FIG. 23. Particularly, as shown in FIG. 23, in the recognition data, object coordinates of a pineapple may be changed from 1-223-342 to 1-123-342 (762a).

The processing portion 240 compares the second recognition data with the first recognition data (1220).

The processing portion 240 compares the first recognition data with the second recognition data, and then extracts a reliability for calculating whether individual products match each other. For example, the processing portion 240 compares two food times in which the type of the identified product is pineapple, and inputs a pineapple included in the first recognition data and a pineapple included in the second recognition data into the trained object recognition algorithm. The object recognition algorithm determines whether two food items are identical to each other, and outputs a result of determination as the reliability.

In response to the reliability being greater than or equal to a first reference value, the processing portion 240 tracks the tag (1231).

Referring to FIGS. 22A, 22B and 22C, the processing portion 240 moves the tag A 661 to the upper side of the pineapple 621a. In addition, the processing portion 240 changes the tag coordinates included in the list 234 to 1-123-322 (763a), as shown in FIG. 23. Tag information including the changed tag coordinates is transmitted from the computing apparatus 200 to the refrigerator 100.

The refrigerator 100 or the user equipment 300 moves and displays the tag (1250).

The refrigerator 100 displays an image, in which the tag A 661 is moved, on the touch screen display 130 based on the received tag information, as shown in FIG. 22C.

In response to the reliability being less than the first reference value and being greater than or equal to a second reference value (1240), the processing portion 240 generates a pop-up and asks a user whether the product is identical or not (1241).

The first reference value refers to a value that the output reliability indicates that it is determined to be the same food. In comparison, the second reference value refers to a value that the computing apparatus 200 determines that it is the same food or the determination is ambiguous. The first reference value and the second reference value may vary according to a manufacturer's setting and a learning result of the computing apparatus 200.

Referring to FIG. 24, the processing portion 240 may identify a pineapple 621b that the user is eaten, from the image stored at the second point of time. The processing portion 240 compares the second recognition data with the first recognition data, but may extract a reliability corresponding to between the first reference value and the second reference value.

In this case, the computing apparatus 240 may request the refrigerator 100 or the user equipment 300 to display the pop-up 710 for requesting confirmation of whether the product is moved.

In response to that a user inputs "yes" in the pop-up 710, the computing apparatus 240 moves the tag A 661 and changes tag information as illustrated in FIG. 22C.

The processing portion 240 requests the refrigerator 100 or the user equipment 300 to move the tag, and the refrigerator 100 or the user equipment 300 moves the tag to the pineapple 621b and display the moved tag.

Accordingly, the food management system 1 compares images imaged at each point of time, and tracks tags, thereby reducing the inconvenience that the user has to manually input the information each time, and the food management system 1 asks a user about food, in which the determination of identity is ambiguous, thereby increasing the reliability of the determination.

Figure 25:
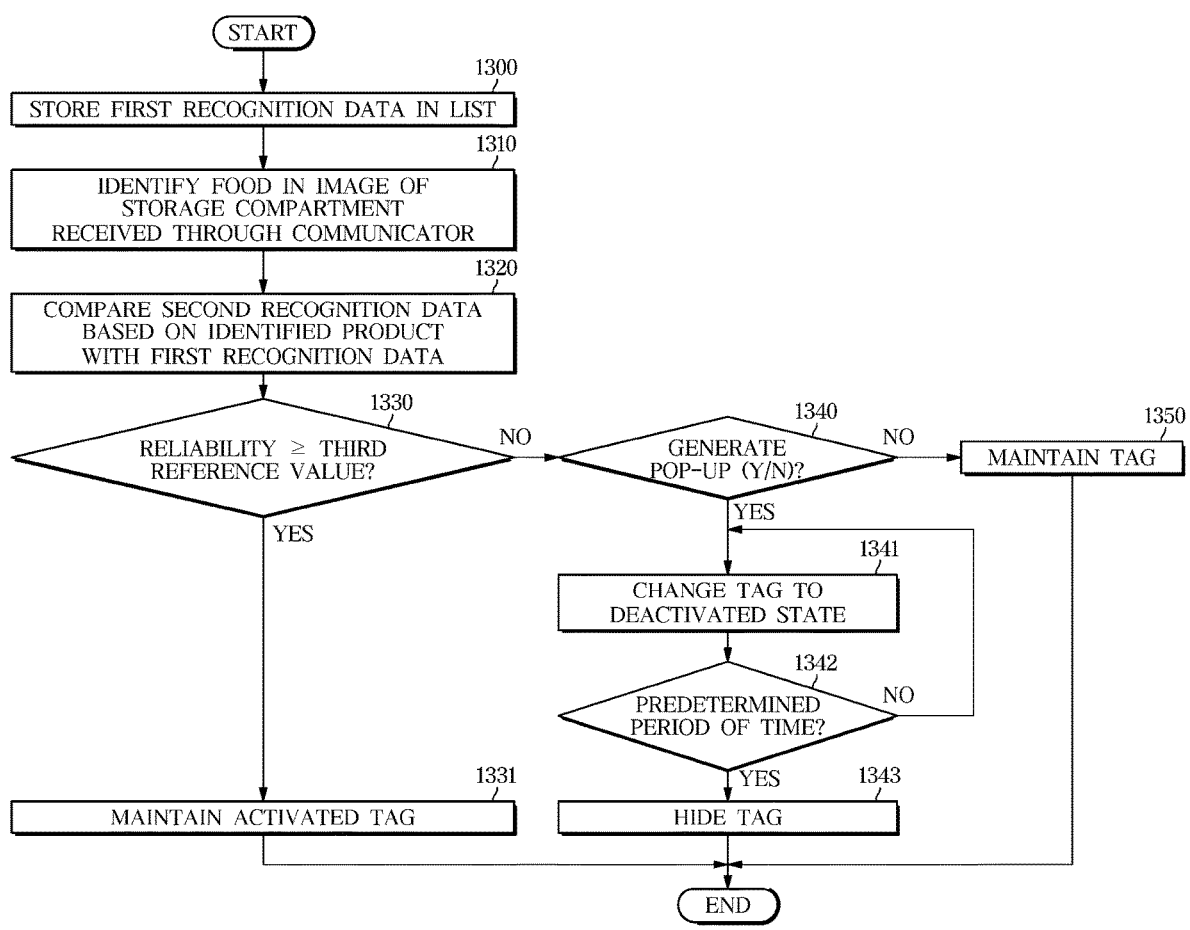
FIG. 25 is flowchart illustrating a method of changing a tag into deactivation when a user takes out of food, according to another embodiment of the present disclosure.
Figure 26A:
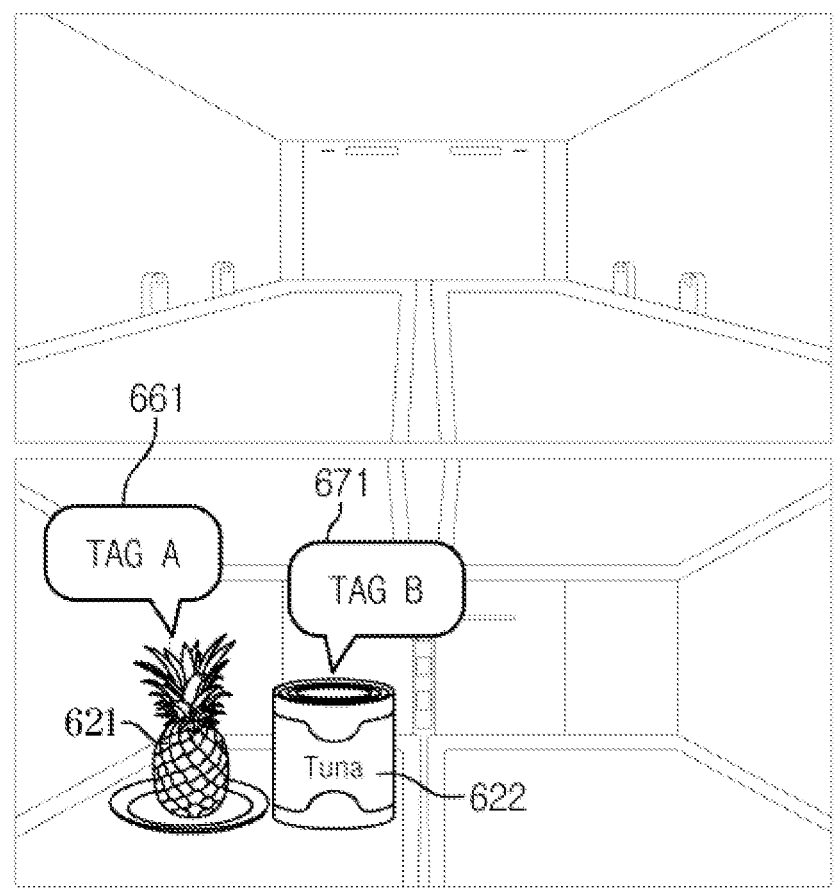
FIGS. 26A and 26B illustrate a change in the inside imaged at a second point of time.
Figure 26B:
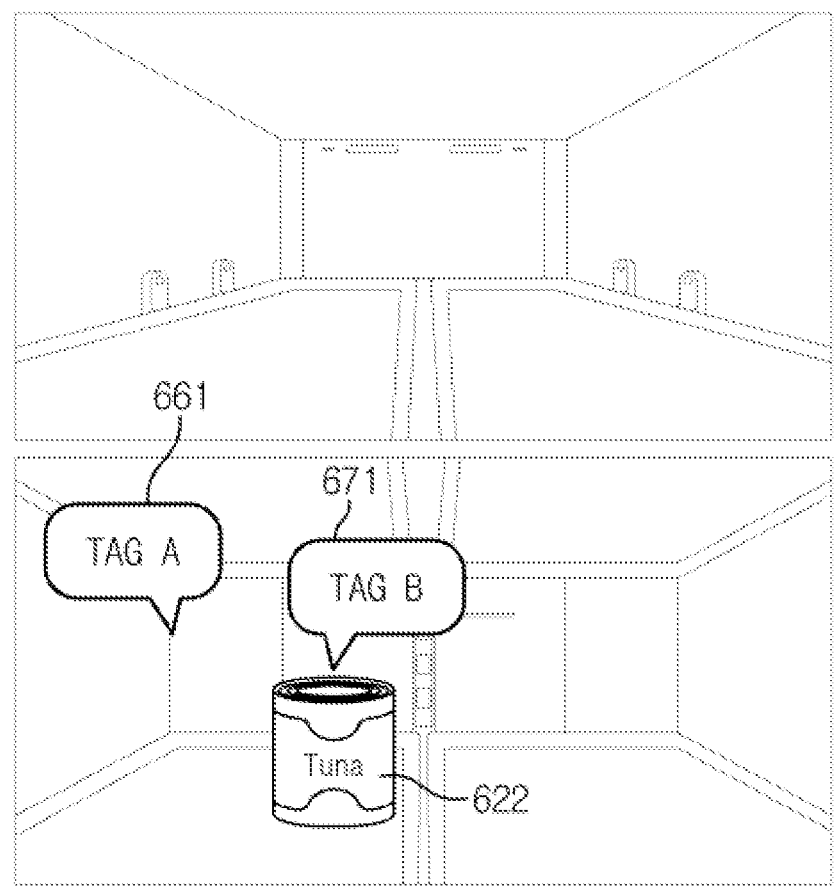
Figure 27A:
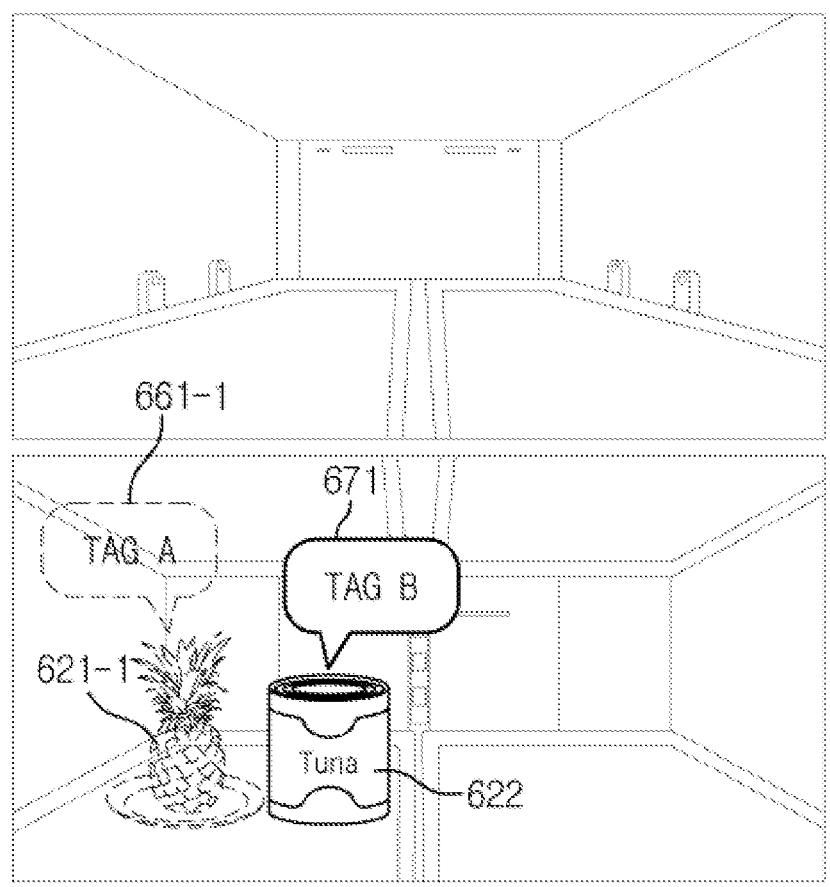
FIGS. 27A and 27B are views illustrating an example of changing tag information according to the method of FIG. 25.
Figure 27B:
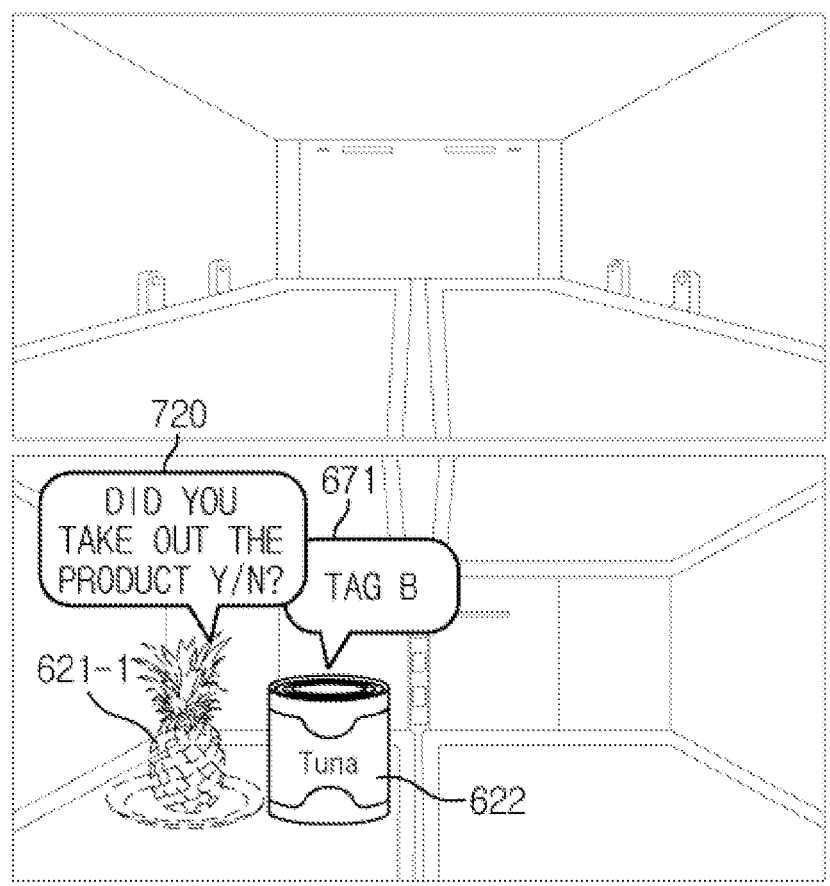

FIG. 25 is flowchart illustrating a method of changing a tag into deactivation when a user takes out of food, according to another embodiment of the present disclosure, FIGS. 26A and 26B illustrate a change in the inside imaged at a second point of time, and FIGS. 27A and 27B is a view illustrating an example of changing tag information according to the method of FIG. 25.

Referring to FIG. 25, the processing portion 240 stores the first recognition data in the list 234 (1300), identifies the food in the image of the storage compartment received by the communicator 220 (1310). The processing portion 240 compares the second recognition data based on the identified product with the first recognition data (1320).

Referring to FIGS. 26A and 26B, tag information generated based on the first recognition data may include a tag A 661 and a tag B 671 as shown in FIG. 26A. The pineapple 621 and the canned food product 622 may be located in the storage compartment 110.

According to embodiments, a user may open the door 120 of the refrigerator 100 and take out the pineapple 621 and the communicator 220 may generate second recognition data based on an image in which the pineapple is disappeared, as illustrated in FIG. 26B.

The processing portion 240 may compare the first recognition data with the second recognition data, and determine that the pineapple 621 is disappeared.

In response to the reliability, which is output according to the result of comparing the recognition data at different point of times, being greater than or equal to a third reference value (1330), the processing portion 240 maintains activation of the tag A 661 (1331).

Unlike FIGS. 26A and 26B, the third reference value is a reference value used to determine a result of comparing the two pineapples in a state in which the food recognized as pineapple is included in the second recognition data. Accordingly, the third reference value may be different from the first reference value and the second reference value.

In response to the reliability, which is output according to the result of comparing the recognition data at different point of times, being less than the third reference value, the processing portion 240 may generate a pop-up and receive confirmation of whether or not the product is taken out from the user (1340).

For example, the processing portion 240 may request the refrigerator 100 or the user equipment 300 to generate the pop-up 720 as shown in FIG. 27B. In this case, the processing portion 240 may display the pineapple 621, which is confirmed to have disappeared, through image processing different from the canned food product 622, and provide a graphic user interface 621-1 to allow a user to check the disappeared food.

In response to that the user inputs "no (N)", the processing portion 240 maintains the tag A 661 (1350).

In response to that the user inputs "yes", the processing portion 240 changes the tag to deactivation (1341).

Referring to FIG. 27A, according to an example, the processing portion 240 may display the deactivated tag A 661-1 and the disappeared pineapple 621-1 which are superposed on the image of the storage compartment.

In response to that the disappeared food is not identified after a predetermined period of time is expired (1342), the processing portion 240 may change the tag to a hidden state (1343).

The predetermined period of time may vary, and may be set differently by a user depending on individual foods.

Accordingly, the food management system 1 compares images imaged at each point of time, and changes tag information about the disappeared food, thereby displaying the result of recognition of the disappeared food to the user, and the food management system 1 may modify the tag information together, thereby reducing inconvenience, in which the user manually changes information of food that is taken out of the refrigerator.

FIG. 28 is a flowchart illustrating a method for processing food in which a tag is changed according to another embodiment of the present disclosure.

Referring to FIG. 28, the processing portion 240 may compare the recognition data and change an activated tag to a deactivated tag for the disappeared food (1400).

The processing portion 240 determines whether or not the recognition data is changed during the predetermined period of time (1410).

Even after the predetermined period of time is expired, the disappeared food may not be put into the storage compartment 110. In this case, the processing portion 240 deletes the recognition data about the disappeared food (1420).

In response to the recognition data being deleted, the recognition data included in the list 234 may also be deleted.

Further, while deleting the recognition data, the processing portion 240 may recommend purchasing foods that are frequently changed from the activation to the deactivation. For example, while deleting the recognition data, the processing portion 240 may count the number of times the deleted food is deactivated, and recommend the purchase of the food, which is counted more than a certain number of times, through the refrigerator 100 or the user equipment 300. In addition, according to the user consent, the processing portion 240 may guide a purchase process by connecting a shopping mall.

Figure 29:
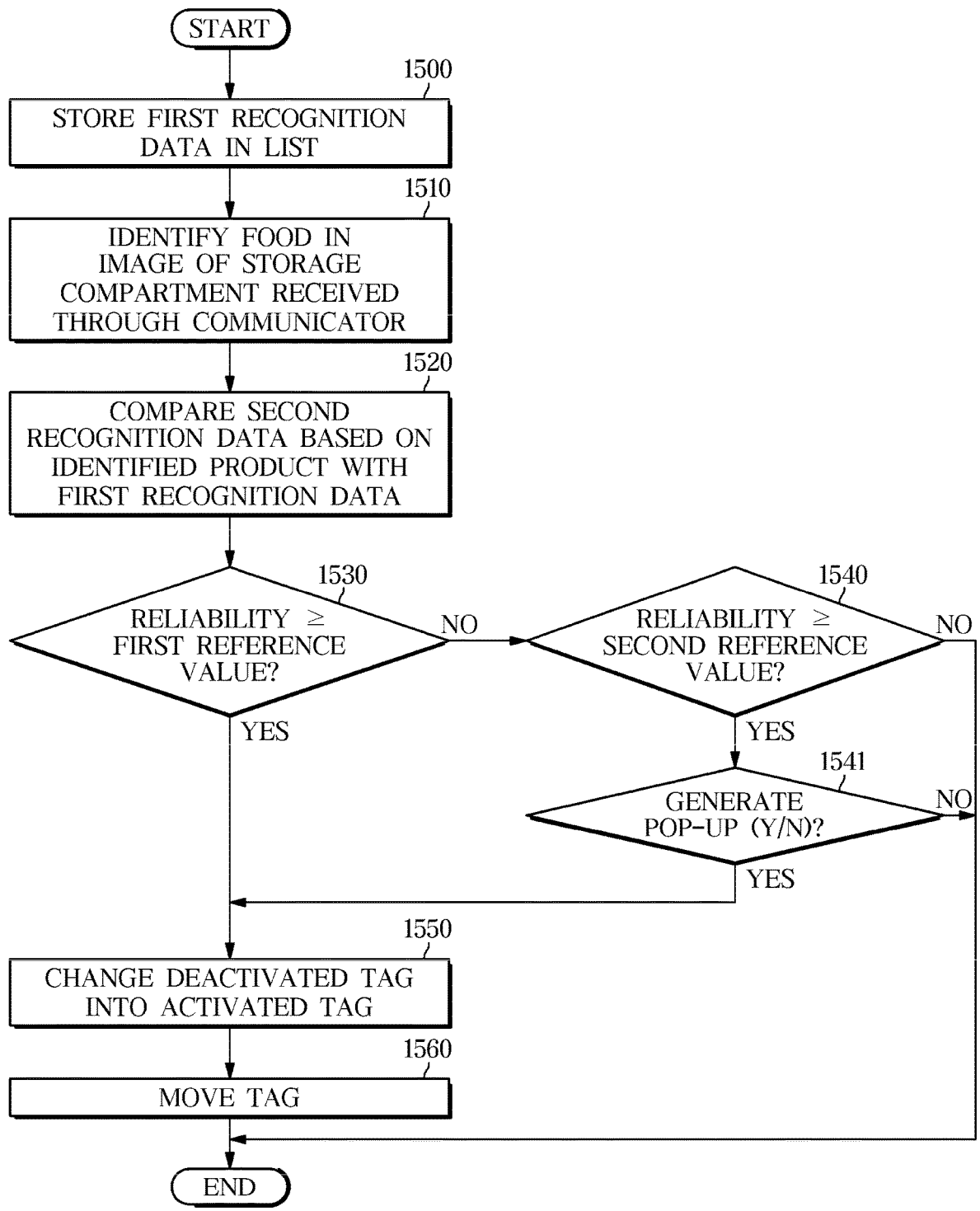
FIG. 29 is a flowchart illustrating a method in which a user changes a deactivated tag of food according to still another embodiment of the present disclosure.
Figure 30A:
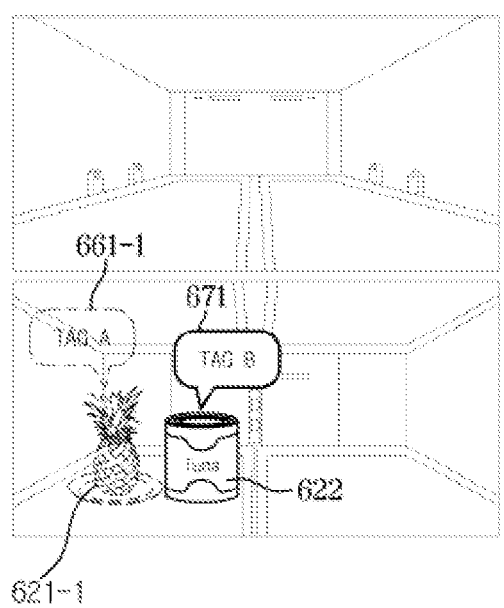
FIGS. 30A, 30B and 30C are views illustrating a method of tracking a tag that is changed into activation.
Figure 30B:
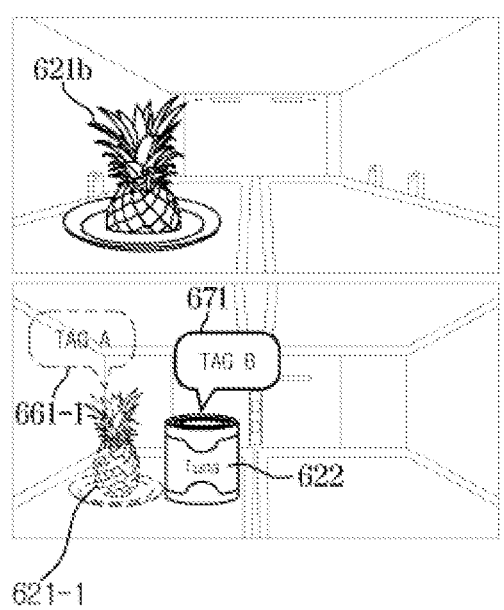
Figure 30C:
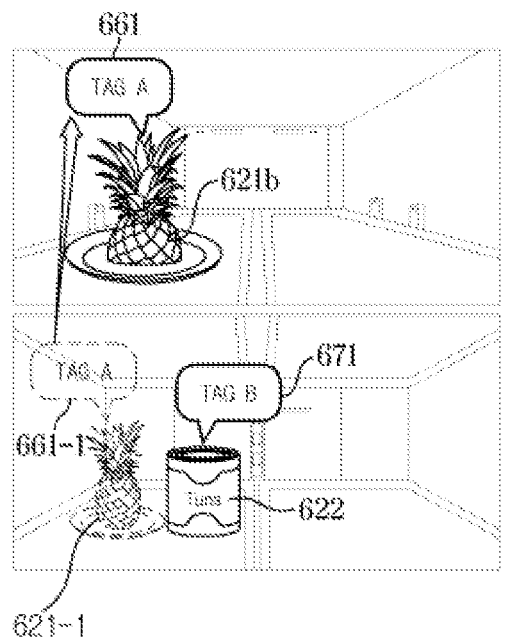
Figure 31A:
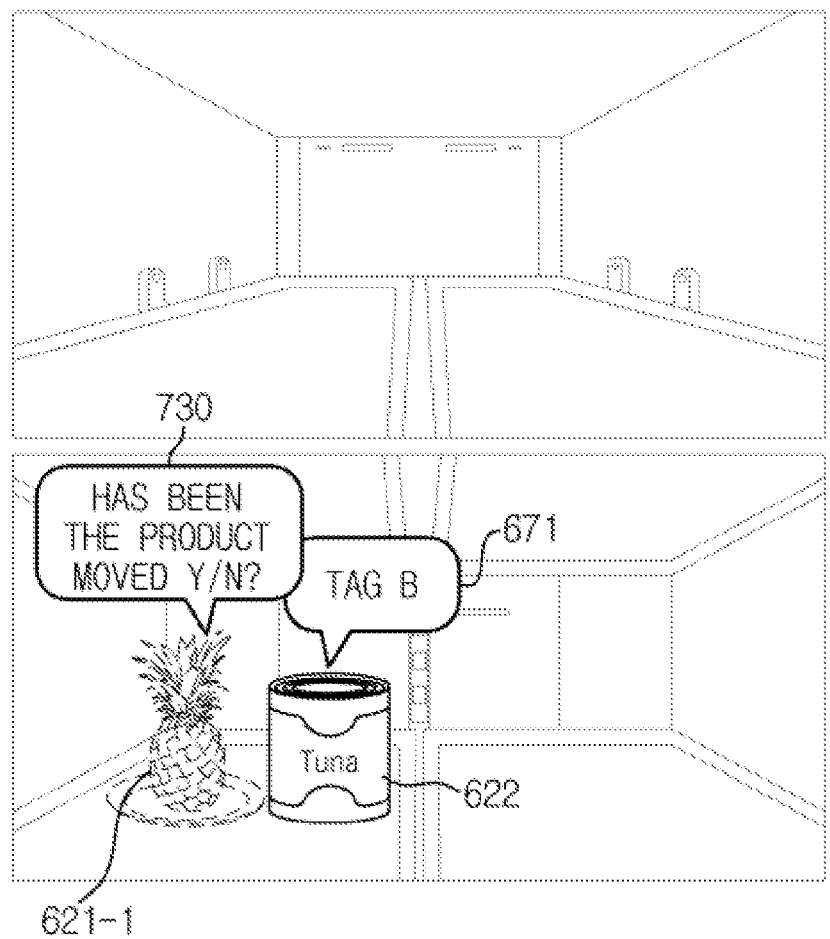
FIGS. 31A and 31B are views illustrating a graphic user interface in which a tag is moved after a pop-up is displayed.
Figure 31B:
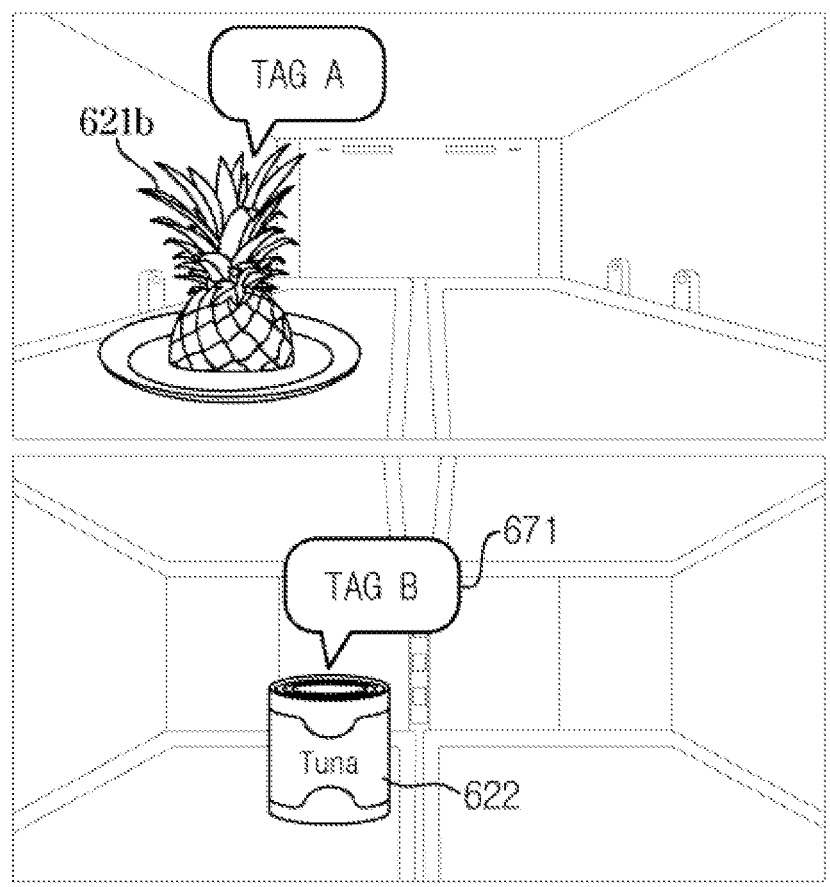

FIG. 29 is a flowchart illustrating a method in which a user changes a deactivated tag of food according to still another embodiment of the present disclosure, FIGS. 30A, 30B and 30C are views illustrating a method of tracking a tag that is changed into activation, and FIGS. 31A and 31B are views illustrating a graphic user interface in which a tag is moved after a pop-up is displayed.

Referring to FIG. 29, the processing portion 240 stores the first recognition data in the list 234 (1500), identifies the food in the image of the storage compartment received by the communicator 220 (1510), and the processing portion 240 may compare the second recognition data based on the identified product with the first recognition data (1520).

The image of the storage compartment and tag information generated based on the first recognition data may include a graphic user interface including a pineapple 621-1 and a deactivated tag A 661-1, as shown in FIG. 30A.

The processing portion 240 may identify a pineapple 621*b* in the image of the storage compartment imaged at the second point of time. The processing portion 240 compares the pineapple 621-1 included in the disappeared first recognition data with the pineapple 621*b* identified in the second recognition data.

In response to the reliability, which is extracted as a result of the comparison of the recognition data, being greater than or equal to the first reference value (1530), the processing portion 240 changes the deactivated tag to the activated tag (1550), and moves the tag (1560).

As shown in FIG. 30C, the deactivated tag A 661-1 may be changed to the activated tag 661 and may be tacked to the upper side of the identified pineapple 621*b*.

In response to a reliability, which is extracted as a result of the comparison of the recognition data, being greater than or equal to the second reference value but less than the first reference value, the processing portion 240 generates a pop-up (1541).

As shown in FIG. 31A, the processing portion 240 may display a pop-up 730 confirming whether the same product is moved, on the refrigerator 100 or the user equipment 300, and ask a user's confirmation.

In response to that a user inputs "yes", the processing portion 240 may change the deactivated tag A 621-1 to the activated tag 621, and superimpose the tag information on the image of the storage compartment and then display the superposed image on the touch screen display 130, as shown in FIG. 31B.

Accordingly, without a user manual input, the food management system 1 may deal with the frequent changes in the state of food stored in the refrigerator by tracking changes in the state of the food in the refrigerator. In addition, the food management system 1 may expand a service associated with food management such as food purchase, and improve user convenience and accuracy of food management.

Further, the above-described embodiment has been described as an operation of the processing portion 240 of the computing apparatus 200. However, the embodiment does not necessarily operate only in the processing portion 240 of the computing apparatus 200, and if there is no limitation of hardware performance such as memory, the above-described embodiment also operates in the controller 190 of the refrigerator 100.

The invention claimed is:

1. A computing apparatus comprising:
a communicator configured to receive an image of a storage compartment of a refrigerator;
a neural network trained with food images to identify food; and
a processor configured to:
provide the received image to the trained neural network so that the trained neural network identifies food in the received image,
store recognition data, which is generated based on the identified food, in a list about food contained in the storage compartment,
generate an image about the identified food,
generate tag information about the identified food based on the identified food and the recognition data,
compare second recognition data generated based on a second received image of the storage compartment at a second point of time with first recognition data generated at a first point of time for a first received image of the storage compartment and stored in the list, the second point of time being later than the first point of time,
compare a reliability, extracted from a result of the comparing the second recognition data with the first recognition data, with predetermined reference values,
in response to the reliability being equal to or greater than a first reference value, modify the tag information generated based on the first recognition data into tag information about food included in the second recognition data,
in response to the reliability being greater than or equal to a second reference value but less than the first reference value, control the refrigerator through the communicator to display a first pop-up asking a user whether the food is moved, and
in response to the reliability being less than a third reference value, control the refrigerator through the communicator to display a second pop-up asking the user whether to deactivate a tag corresponding to the tag information generated based on the first recognition data.

2. The computing apparatus of claim 1, wherein
the processor is configured to match the identified food with recognition data included in the list, and generate the tag information by a result of matching, and
the communicator is configured to transmit the generated tag information and the generated image to the refrigerator.

3. The computing apparatus of claim 1, wherein the processor is configured to:
in response to the reliability being greater than the third reference value, determine to activate the tag corresponding to the tag information generated based on the first recognition data.

4. The computing apparatus of claim 1, wherein
the processor is configured to:
change the tag into deactivation based on a result of the second pop-up that is received from the user through the communicator.

5. The computing apparatus of claim 4, wherein
the processor is configured to:
determine whether or not recognition data matching the deactivated tag changes during a predetermined period of time, and delete the recognition data matching the deactivated tag based on a result of determination.

6. The computing apparatus of claim 4, wherein the processor is configured to delete recognition data matching the deactivated tag based on purchase data regarding food received from the communicator.

7. The computing apparatus of claim 1, wherein the processor is configured to:
- receive data inputted by the user from the communicator, and add the received data to the tag information, and
- move the received data, which is included in the second recognition data, to the tag information included in the first recognition data.

8. A refrigerator comprising:
- a body;
- a storage compartment provided inside the body;
- a camera provided in the body to image an inside of the storage compartment;
- a touch screen provided outside the body;
- a communicator configured to communicate with a computing apparatus; and
- a controller configured to:
  - control the camera to obtain an image of the inside of the storage compartment,
  - transmit the image of the inside of the storage compartment to the computing apparatus through the communicator,
  - receive tag information about food included in the image of the inside of the storage compartment from the computing apparatus through the communicator,
  - generate a first graphic user interface of a tag based on the received tag information,
  - control the touch screen to display the first graphic user interface by superposing the first graphic user interface on the image of the inside of the storage compartment,
  - in response to a first request being received from the computing apparatus, control the touch screen to display a first pop-up asking a user whether the food corresponding to the tag is moved, and
  - in response to a second request being received from the computing apparatus, control the touch screen to display a second pop-up asking the user whether to deactivate the tag.

9. The refrigerator of claim 8, wherein the controller is configured to:
- receive data from a user related to food identified by the computing apparatus through the touch screen, and
- transmit the data to the computing apparatus through the communicator.

10. The refrigerator of claim 9, wherein the controller is configured to:
- generate a second graphic user interface displaying the data received from the user included in the tag information received from the computing apparatus, and
- control the touch screen to display the second graphic user interface by superposing the second graphic user interface on the first graphic user interface of the tag.

11. The refrigerator of claim 8, wherein the controller is configured to:
- determine whether to activate the first graphic user interface of the tag already generated based on the tag information, and
- control the touch screen to display the first graphic user interface of the activated tag or a second graphic user interface of a deactivated tag.

* * * * *